(12) United States Patent
Furusho

(10) Patent No.: US 7,184,996 B2
(45) Date of Patent: Feb. 27, 2007

(54) METHOD FOR CONCATENATING TABLE-FORMAT DATA

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 329 days.

(21) Appl. No.: 10/494,263

(22) PCT Filed: Nov. 11, 2002

(86) PCT No.: PCT/JP02/11721

§ 371 (c)(1),
(2), (4) Date: Apr. 30, 2004

(87) PCT Pub. No.: WO03/040960

PCT Pub. Date: May 15, 2003

(65) Prior Publication Data

US 2005/0108184 A1 May 19, 2005

(30) Foreign Application Priority Data

Nov. 9, 2001 (JP) ............................. 2001-344644

(51) Int. Cl.
*G06F 17/30* (2006.01)
(52) U.S. Cl. .......................... 707/1; 707/101; 707/102; 707/103; 707/104.1
(58) Field of Classification Search ................ 707/100, 707/5, 205, 104.1, 103 R; 711/154; 709/249; 345/600; 370/372
See application file for complete search history.

(56) References Cited

U.S. PATENT DOCUMENTS 5,675,784 A * 10/1997 Maxwell et al. ............ 707/100

(Continued)

FOREIGN PATENT DOCUMENTS

| WO | WO 00/10103 | 2/2000 |
|---|---|---|
| WO | WO 02/10976 | 2/2000 |
| WO | WO 00/73939 | 12/2000 |

OTHER PUBLICATIONS

International Search Report in English for PCT/JP02/11721, completed Dec. 18, 2002, and mailed Jan. 14, 2003, from the Japanese Patent Office.
International Search Report in Japanese for PCT/JP02/11721, completed Dec. 18, 2002, and mailed Jan. 14, 2003, from the Japanese Patent Office.

* cited by examiner

*Primary Examiner*—Don Wong
*Assistant Examiner*—Patrick A. Darno
(74) *Attorney, Agent, or Firm*—Griffin & Szipl, P.C.

(57) ABSTRACT

A plurality of table-formatted data is joined by dividing each table-formatted data into one or more information blocks consisting of a value list containing item values in the order of item value numbers corresponding to item values belonging to a particular item and a pointer array containing pointer values specifying item value numbers in the order of uniquely-defined record number. When joining a plurality of table formats, equivalent items between the table-formatted data are found and value lists contained in the information block concerning the equivalent items are compared and the two value lists are made equivalent, then data of one of the table formats is sorted according to a key item and using the array obtained in this process, calculation is performed to obtain addresses indicating storage positions of record numbers of table-formatted data and other table-formatted data. Using the calculated addresses, joined table-formatted data is displayed.

10 Claims, 25 Drawing Sheets

U.S. PATENT DOCUMENTS

| | | | |
|---|---|---|---|
| 5,748,905 A * | 5/1998 | Hauser et al. | 709/249 |
| 5,778,370 A * | 7/1998 | Emerson | 707/100 |
| 6,611,274 B1 * | 8/2003 | Keely et al. | 345/600 |
| 6,643,644 B1 * | 11/2003 | Furusho | 707/5 |
| 6,721,751 B1 * | 4/2004 | Furusho | 707/100 |
| 6,886,082 B1 * | 4/2005 | Furusho | 711/154 |
| 6,973,467 B1 * | 12/2005 | Furusho | 707/205 |
| 2003/0189925 A1 * | 10/2003 | Wellbaum et al. | 370/372 |
| 2004/0044683 A1 * | 3/2004 | Shinji | 707/103 R |
| 2006/0059197 A1 * | 3/2006 | Furusho | 707/104.1 |

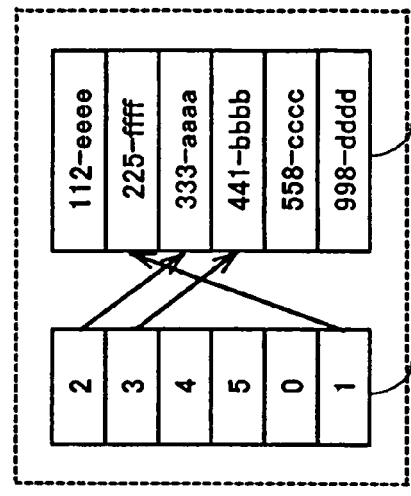
FIG. 3A
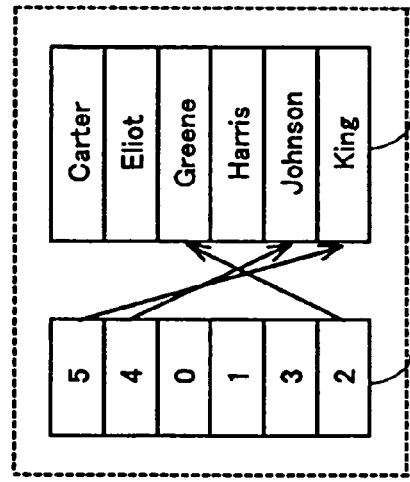
FIG. 3B
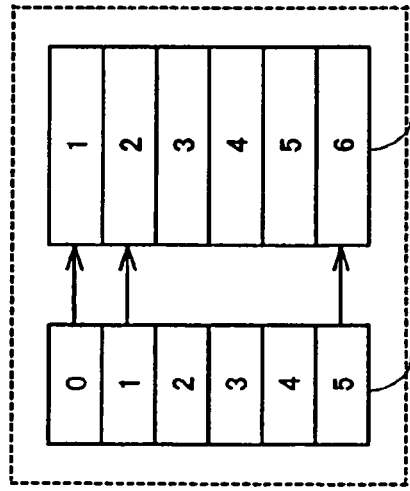
FIG. 3C
FIG. 3D

FIG. 4A
| RECORD NUMBER | GENDER | AGE | OCCUPATION |
|---|---|---|---|
| 0 | FEMAIL | 18 | PROGRAMMER |
| 1 | MAIL | 21 | STUDENT |
| 2 | FEMAIL | 31 | TEACHER |
| ⋮ | ⋮ | ⋮ | ⋮ |
| 999999 | FEMAIL | 16 | STUDENT |
FIG. 4B
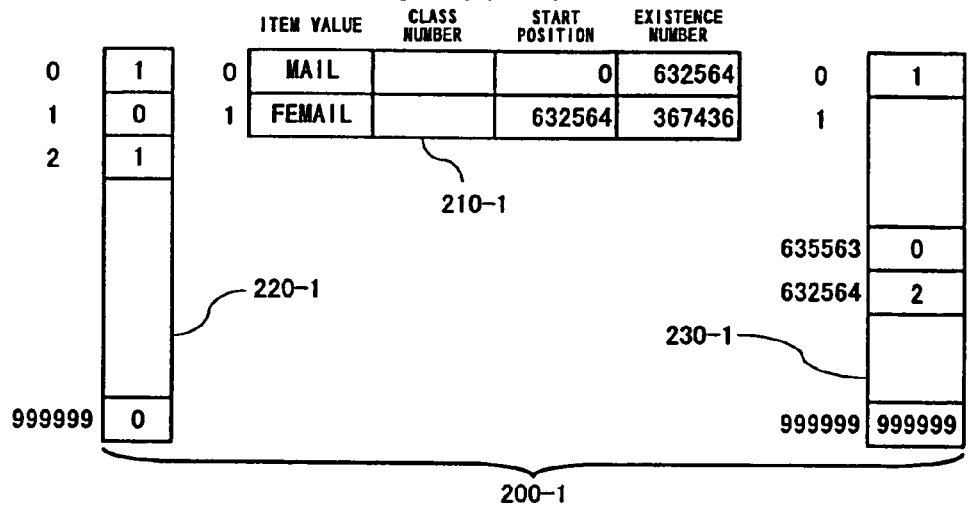
FIG. 4C
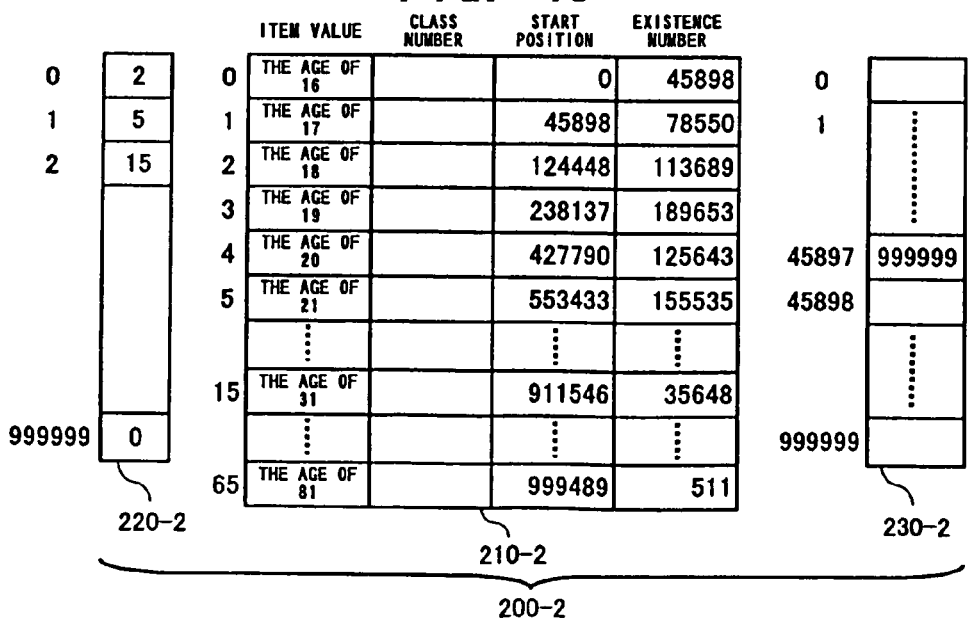

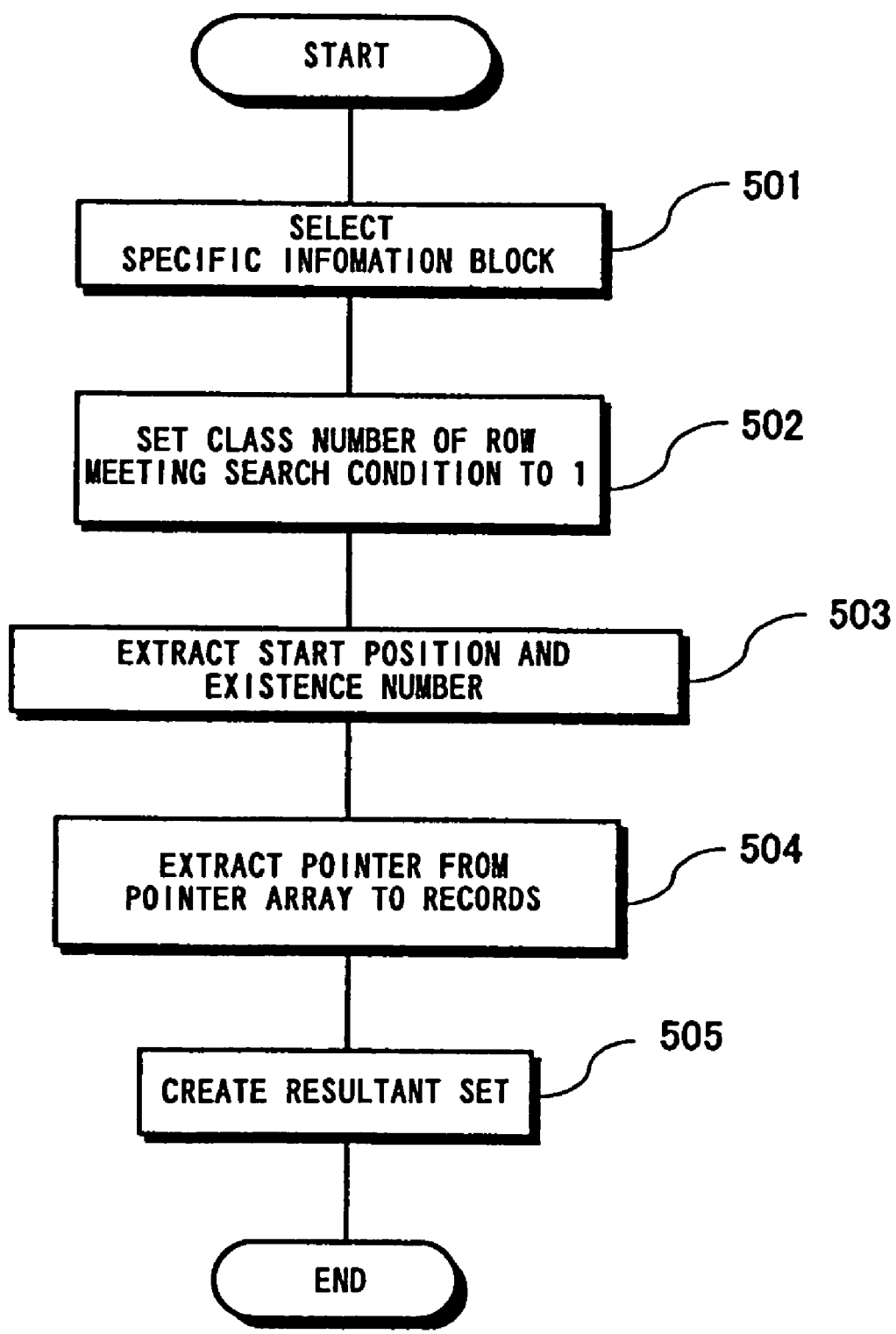

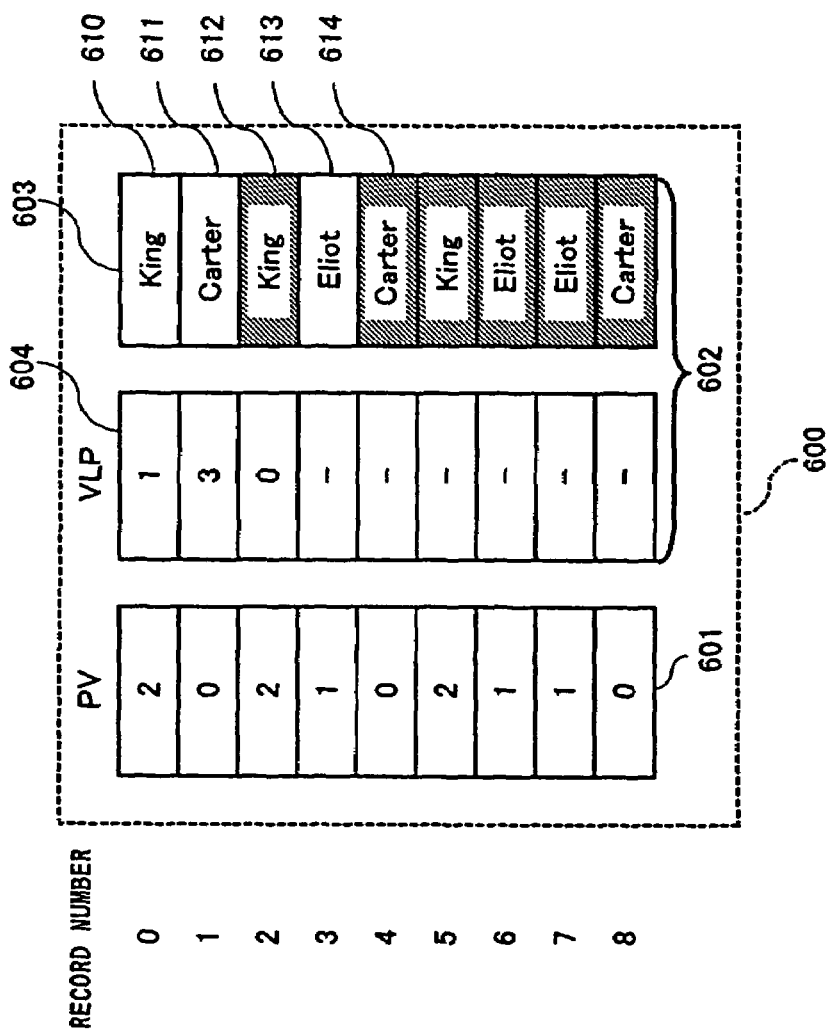

FIG. 8A

BASEBALL FAN CLUB MEMBER ORIGINAL TABLE 800

| | MEMBER NAME | AREA | FAN |
|---|---|---|---|
| 0 | King | Tokyo | G-team |
| 1 | Carter | North | G-team |
| 2 | Greene | Tokyo | T-team |
| 3 | Williams | North | B-team |
| 4 | Eliot | Kanagawa | B-team |
| 5 | Harris | Kyoto | T-team |
| 6 | Lee | Kanagawa | B-team |
| 7 | Moore | Esaka | T-team |
| 8 | Smith | Aichi | D-team |
| 9 | Johnson | Tokyo | G-team |

BASEBALL FAN CLUB MEMBER TABLE 801

| | MEMBER NAME | AREA | FAN |
|---|---|---|---|
| 0 | King | Tokyo | G-team |
| 2 | Greene | Tokyo | T-team |
| 9 | Johnson | Tokyo | G-team |

FIG. 8B

GAME SCHEDULE ORIGINAL TABLE 810

| | BASEBALL TEAM | GAME DAY | BASEBALL FIELD |
|---|---|---|---|
| 0 | T-team | May, 10 | E-tokyo |
| 1 | S-team | May, 10 | Nagoya |
| 2 | C-team | May, 10 | W-hiroshima |
| 3 | D-team | May, 10 | Nagoya |
| 4 | G-team | May, 10 | E-Tokyo |
| 5 | B-team | May, 10 | W-hiroshima |
| 6 | T-team | May, 11 | Yokohama |
| 7 | S-team | May, 11 | W-hiroshima |
| 8 | C-team | May, 11 | W-hiroshima |
| 9 | D-team | May, 11 | E-Tokyo |
| 10 | G-team | May, 11 | E-Tokyo |
| 11 | B-team | May, 11 | Yokohama |

GAME SCHEDULE TABLE 811

| | BASEBALL TEAM | GAME DAY | BASEBALL FIELD |
|---|---|---|---|
| 0 | T-team | May, 10 | E-tokyo |
| 4 | G-team | May, 10 | E-tokyo |
| 9 | D-team | May, 11 | E-tokyo |
| 10 | G-team | May, 11 | E-tokyo |

MASTER SIDE

| | MEMBER NAME | AREA | FAN |
|---|---|---|---|
| 0 | King | Tokyo | G-team |
| 0 | King | Tokyo | G-team |
| 2 | Greene | Tokyo | T-team |
| 9 | Johnson | Tokyo | G-team |
| 9 | Johnson | Tokyo | G-team |

SLAVE SIDE

| | BASEBALL TEAM | GAME DAY | BASEBALL FIELD |
|---|---|---|---|
| 4 | G-team | May, 10 | E-Tokyo |
| 9 | G-team | May, 11 | E-Tokyo |
| 0 | T-team | May, 10 | E-Tokyo |
| 4 | G-team | May, 10 | E-Tokyo |
| 9 | G-team | May, 11 | E-Tokyo |

| | MEMBER NAME |
|---|---|
| 0 | Carter |
| 1 | Eliot |
| 2 | Greene |
| 3 | Harris |
| 4 | Johnson |
| 5 | King |
| 6 | Lee |
| 7 | Moore |
| 8 | Smith |
| 9 | Williams |

1111

| | PVL |
|---|---|
| 0 | 5 |
| 1 | 0 |
| 2 | 2 |
| 3 | 9 |
| 4 | 1 |
| 5 | 3 |
| 6 | 6 |
| 7 | 8 |
| 8 | 8 |
| 9 | 4 |

1112

1102 AREA

| | AREA |
|---|---|
| 0 | Aichi |
| 1 | Esaka |
| 2 | Kanagawa |
| 3 | Kyoto |
| 4 | North |
| 5 | Tokyo |

| | PVL |
|---|---|
| 0 | 5 |
| 1 | 4 |
| 2 | 5 |
| 3 | 4 |
| 4 | 2 |
| 5 | 3 |
| 6 | 2 |
| 7 | 1 |
| 8 | 0 |
| 9 | 5 |

1103 FAN

| | FAN |
|---|---|
| 0 | B-team |
| 1 | D-team |
| 2 | G-team |
| 3 | T-team |

| | PVL |
|---|---|
| 0 | 2 |
| 1 | 2 |
| 2 | 3 |
| 3 | 0 |
| 4 | 0 |
| 5 | 3 |
| 6 | 0 |
| 7 | 3 |
| 8 | 1 |
| 9 | 2 |

FIG. 11B

| ORDERED SET | |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

| | MEMBER NAME | AREA | FAN |
|---|---|---|---|
| 0 | King | Tokyo | G-team |
| 1 | Carter | North | G-team |
| 2 | Greene | Tokyo | T-team |
| 3 | Williams | North | B-team |
| 4 | Eliot | Kanagawa | B-team |
| 5 | Harris | Kyoto | T-team |
| 6 | Lee | Kanagawa | B-team |
| 7 | Moore | Esaka | T-team |
| 8 | Smith | Aichi | D-team |
| 9 | Johnson | Tokyo | G-team |

1121

| ORDERED SET | |
|---|---|
| 0 | 0 |
| 1 | 2 |
| 2 | 9 |

ONLY MEMBER OF "TOKYO" IS EXTRACTED

1122 OBTAINED IMAGE

| | MEMBER NAME | AREA | FAN |
|---|---|---|---|
| 0 | King | Tokyo | G-team |
| 2 | Greene | Tokyo | T-team |
| 9 | Johnson | Tokyo | G-team |

FIG. 12A

1201 BASEBALL TEAM

| | BASEBALL TEAM |
|---|---|
| 0 | B-team |
| 1 | C-team |
| 2 | D-team |
| 3 | G-team |
| 4 | S-team |
| 5 | T-team |

1211

| | PVL |
|---|---|
| 0 | 5 |
| 1 | 4 |
| 2 | 1 |
| 3 | 2 |
| 4 | 3 |
| 5 | 0 |
| 6 | 5 |
| 7 | 4 |
| 8 | 1 |
| 9 | 2 |
| 10 | 3 |
| 11 | 0 |

1212

1202 GAME DAY

| | GAME DAY |
|---|---|
| 0 | MAY, 10 |
| 1 | MAY, 11 |

| | PVL |
|---|---|
| 0 | 0 |
| 1 | 0 |
| 2 | 0 |
| 3 | 0 |
| 4 | 0 |
| 5 | 0 |
| 6 | 1 |
| 7 | 1 |
| 8 | 1 |
| 9 | 1 |
| 10 | 1 |
| 11 | 1 |

1203 BASEBALL FIELD

| | BASEBALL FIELD |
|---|---|
| 0 | E-Tokyo |
| 1 | Nagoya |
| 2 | W-hiroshima |
| 3 | Yokohama |

| | PVL |
|---|---|
| 0 | 0 |
| 1 | 1 |
| 2 | 2 |
| 3 | 1 |
| 4 | 0 |
| 5 | 2 |
| 6 | 3 |
| 7 | 2 |
| 8 | 2 |
| 9 | 0 |
| 10 | 0 |
| 11 | 3 |

FIG. 12B

| ORDERED SET | BASEBALL TEAM | GAME DAY | BASEBALL FIELD |
|---|---|---|---|
| 0 | T-team | MAY, 10 | E-tokyo |
| 1 | S-team | MAY, 10 | Nagoya |
| 2 | C-team | MAY, 10 | W-hiroshima |
| 3 | D-team | MAY, 10 | Nagoya |
| 4 | G-team | MAY, 10 | E-Tokyo |
| 5 | B-team | MAY, 10 | W-hiroshima |
| 6 | T-team | MAY, 11 | Yokohama |
| 7 | S-team | MAY, 11 | W-hiroshima |
| 8 | C-team | MAY, 11 | W-hiroshima |
| 9 | D-team | MAY, 11 | E-Tokyo |
| 10 | G-team | MAY, 11 | E-Tokyo |
| 11 | B-team | MAY, 11 | Yokohama |

ONLY MEMBER OF "TOKYO" IS EXTRACTED

ORDERED SET 1221

| | |
|---|---|
| 0 | 0 |
| 1 | 4 |
| 2 | 9 |
| 3 | 10 |

OBTAINED IMAGE

| | MEMBER NAME | AREA | FAN |
|---|---|---|---|
| 0 | T-team | MAY, 10 | E-Tokyo |
| 4 | G-team | MAY, 10 | E-Tokyo |
| 9 | D-team | MAY, 11 | E-Tokyo |
| 10 | G-team | MAY, 11 | E-Tokyo |

FAN

| | PVL | | VALUE LIST |
|---|---|---|---|
| 0 | 3 | 0 | B-team |
| 1 | 3 | 1 | C-team |
| 2 | 5 | 2 | D-team |
| 3 | 0 | 3 | G-team |
| 4 | 0 | 4 | S-team |
| 5 | 5 | 5 | T-team |
| 6 | 0 | | |
| 7 | 5 | | |
| 8 | 2 | | |
| 9 | 3 | | |

BASEBALL TEAM

| | PVL | | VALUE LIST |
|---|---|---|---|
| 0 | 5 | 0 | B-team |
| 1 | 4 | 1 | C-team |
| 2 | 1 | 2 | D-team |
| 3 | 2 | 3 | G-team |
| 4 | 3 | 4 | S-team |
| 5 | 0 | 5 | T-team |
| 6 | 5 | | |
| 7 | 4 | | |
| 8 | 1 | | |
| 9 | 2 | | |
| 10 | 3 | | |
| 11 | 0 | | |

1502

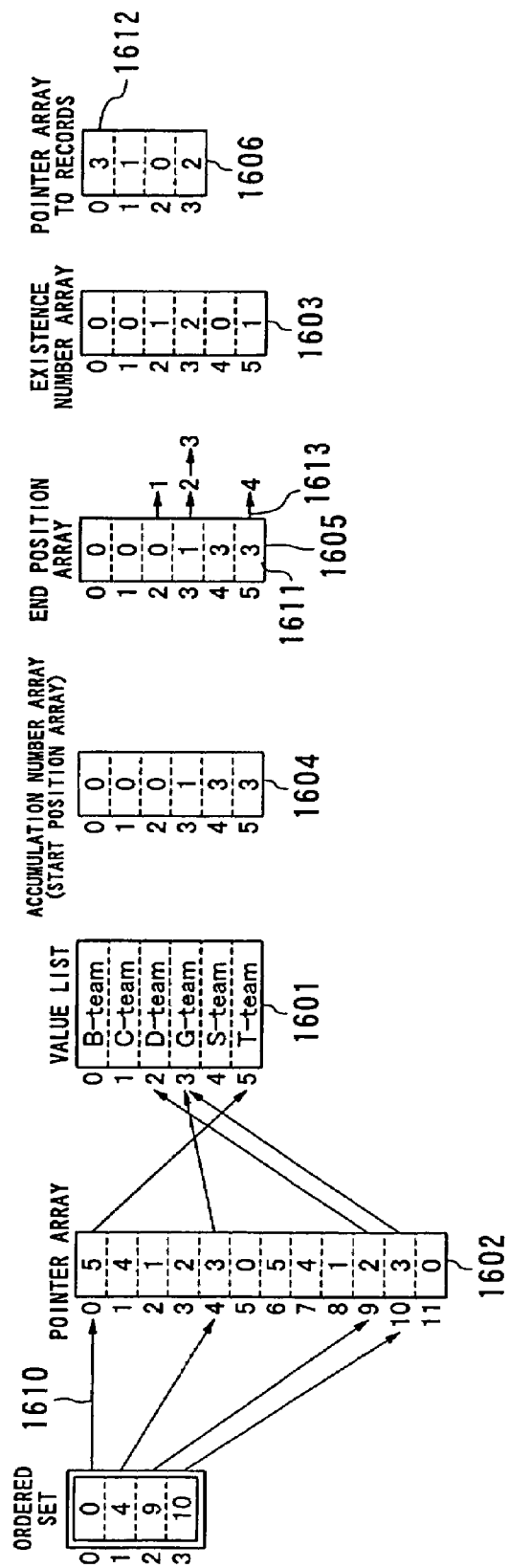

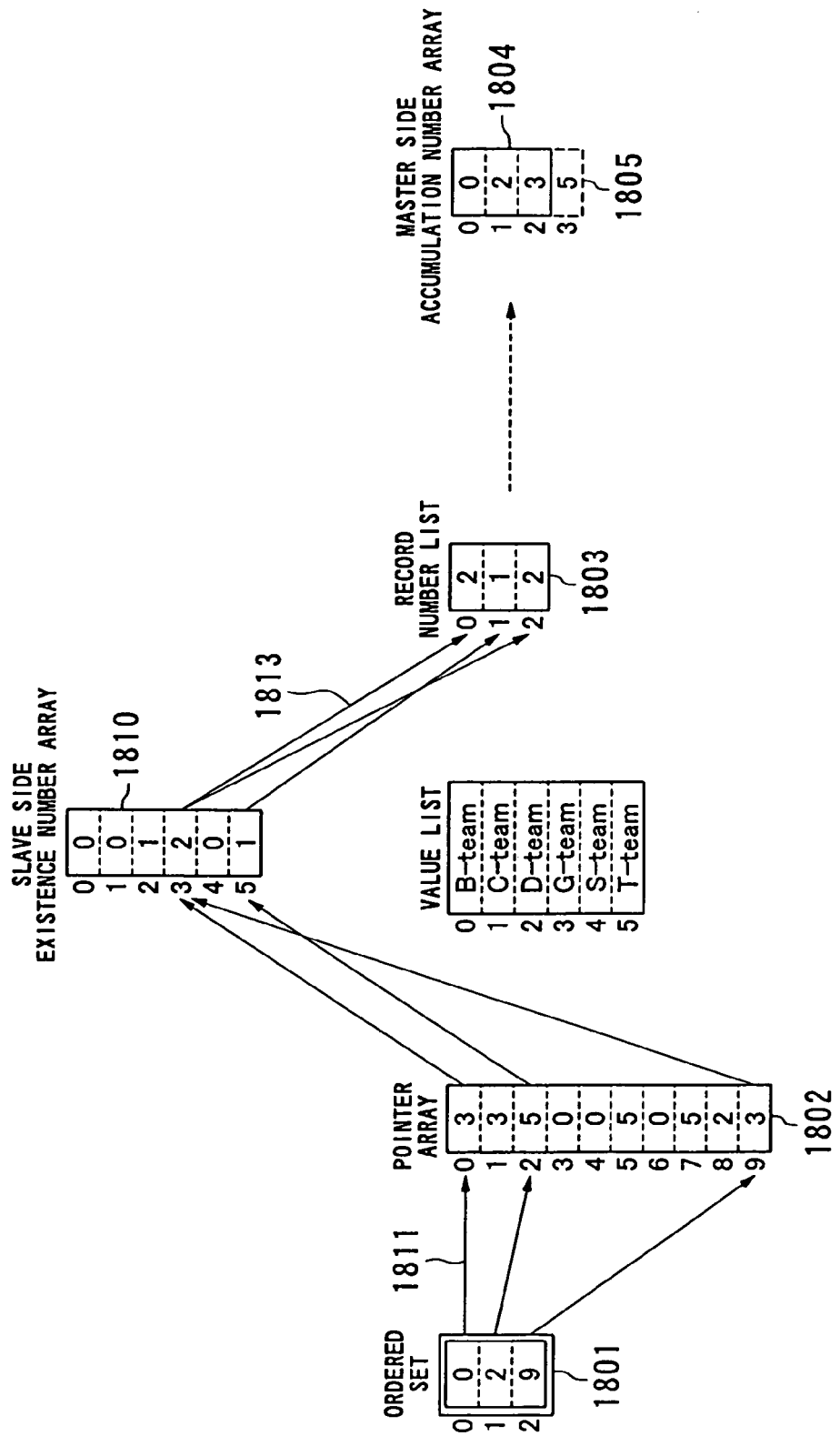

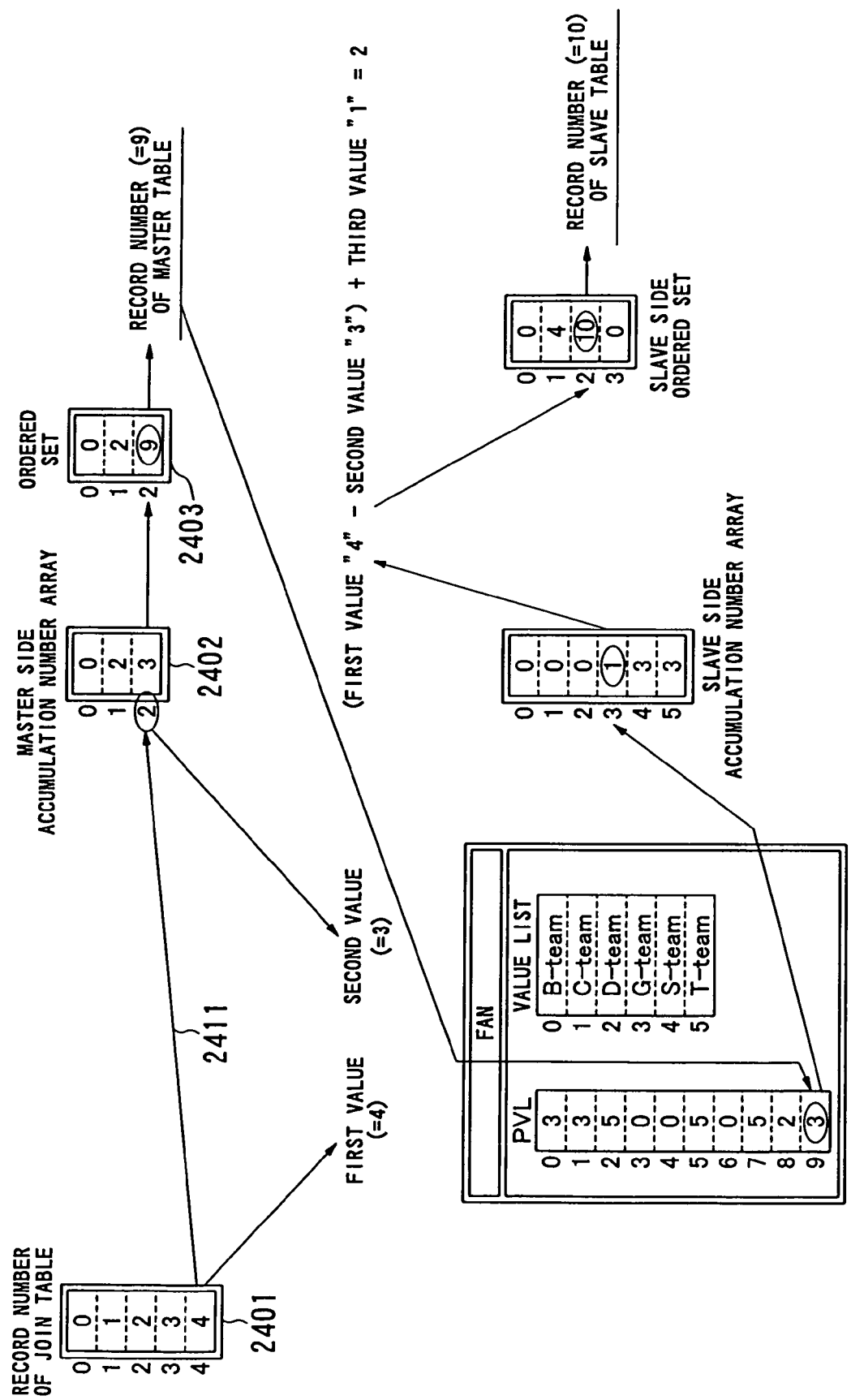

FIG. 25

RECORD NUMBER OF JOIN TABLE (2500)

| | |
|---|---|
| 0 | 0 |
| 1 | 1 |
| 2 | 2 |
| 3 | 3 |
| 4 | 4 |

RECORD NUMBER OF MASTER TABLE (2501)

| | |
|---|---|
| 0 | 0 |
| 1 | 0 |
| 2 | 2 |
| 3 | 9 |
| 4 | 9 |

RECORD NUMBER OF SLAVE TABLE (2502)

| | |
|---|---|
| 0 | 4 |
| 1 | 10 |
| 2 | 0 |
| 3 | 4 |
| 4 | 10 |

BASEBALL FAN CLUB MEMBER ORIGINAL TABLE

| | MEMBER NAME | AREA | FAN |
|---|---|---|---|
| 0 | King | Tokyo | G-team |
| 1 | Carter | North | G-team |
| 2 | Greene | Tokyo | T-team |
| 3 | Williams | North | B-team |
| 4 | Eliot | Kanagawa | B-team |
| 5 | Harris | Kyoto | T-team |
| 6 | Lee | Kanagawa | B-team |
| 7 | Moore | Esaka | T-team |
| 8 | Smith | Aichi | D-team |
| 9 | Johnson | Tokyo | G-team |

GAME SCHEDULE ORIGINAL TABLE

| | BASEBALL TEAM | GAME DAY | BASEBALL FIELD |
|---|---|---|---|
| 0 | T-team | MAY, 10 | E-tokyo |
| 1 | S-team | MAY, 10 | Nagoya |
| 2 | C-team | MAY, 10 | W-hiroshima |
| 3 | D-team | MAY, 10 | Nagoya |
| 4 | G-team | MAY, 10 | E-Tokyo |
| 5 | B-team | MAY, 10 | W-hiroshima |
| 6 | T-team | MAY, 11 | Yokohama |
| 7 | S-team | MAY, 11 | W-hiroshima |
| 8 | C-team | MAY, 11 | W-hiroshima |
| 9 | D-team | MAY, 11 | E-Tokyo |
| 10 | G-team | MAY, 11 | E-Tokyo |
| 11 | B-team | MAY, 11 | Yokohama |

BASEBALL FAN CLUB MEMBER TABLE (2510)

| | MEMBER NAME | AREA | FAN |
|---|---|---|---|
| 0 | King | Tokyo | G-team |
| 0 | King | Tokyo | G-team |
| 2 | Greene | Tokyo | T-team |
| 9 | Johnson | Tokyo | G-team |
| 9 | Johnson | Tokyo | G-team |

GAME SCHEDULE TABLE (2511)

| | BASEBALL TEAM | GAME DAY | BASEBALL FIELD |
|---|---|---|---|
| 4 | G-team | MAY, 10 | E-tokyo |
| 10 | G-team | MAY, 11 | E-tokyo |
| 0 | T-team | MAY, 10 | E-tokyo |
| 4 | G-team | MAY, 10 | E-tokyo |
| 10 | G-team | MAY, 11 | E-tokyo | ion No. PCT/JP02/11721
METHOD FOR CONCATENATING TABLE-FORMAT DATA

This is a National Phase Application in the United States of International Patent Application No. PCT/JP02/11721 filed Nov. 11, 2002, which claims priority on Japanese Patent Application No. 2001-344644, filed Nov. 9, 2001. The entire disclosures of the above patent applications are hereby incorporated by reference.

TECHNICAL FIELD

The present invention relates to a data processing method and a data processing apparatus for processing a large amount of data by using an information processing apparatus such as a computer, and more particularly to a method and an apparatus for concatenating plural table-format data in a relational database and for retrieving, tabulating and sorting item values of desired records or the like.

BACKGROUND OF THE INVENTION

Although databases are used for various uses, the use of a relational database (RDB) which can eliminate a logical contradiction has become the mainstream in a medium-scale to large-scale system. For example, the RDB is used in a system of an airline seat reservation or the like. In this case, by specifying a key item, it is possible to quickly retrieve targets (one target in many cases), or to confirm, cancel or change reservations. Besides, since the number of seats on each flight is several hundred at most, it is also possible to obtain the number of empty seats on a specific airline flight.

However, it is known that when an attempt is made to use this RDB to perform a specific operation (for example, calculation of the load factor) for each fiscal year, each day of the week, each month, each route, each time zone or each type of airplane, it takes a very long time. That is, while the RDB is superior in realizing a processing without contradictions, it has poor performance in searching, tabulating or sorting a considerable number of records.

Thus, in recent years, for the purpose of searching and tabulating, it has become general to construct a database called a data warehouse (DWH) in a system in addition to the RDB. That is, an extremely large-scale database having specific data formats and data item names to match the specific purpose of the end user is constructed, and the end user can use this to perform specific searches and tabulation.

However, to provide the DWH in addition to the RDB, that is, to provide plural databases deviates from the original form that the database, especially the RDB, was contrived for the purpose of enabling the central control of data, and this causes various problems as described below.

(1) Since the DWH is static, it is difficult to perform searching and tabulation of items other than those previously provided in the DWH.
(2) Since the static DWH is provided in addition to the RDB, the data capacity becomes extremely large, and it cannot deal with the update of the RDB and the like.

In view of the above problems, the present inventor invented a method of realizing a high speed join and filed this (PCT/WO00/73939). Also in this method, it is desirable that a data area necessary at an operation can be further reduced. Also in the above method of the join, there is a problem that a relatively large memory space is required since an array is created which becomes a product set of part of table-format data to be joined.

The present invention has an object to provide a structure of table-format data in which plural table-format data can be joined at desired high speeds and its data capacity is small, a concatenating method thereof, and a method of presenting the concatenated table-format data at extremely high speeds.

Besides, the invention has an object to provide a method in which at the time of a join processing, a large amount of data areas are not required for that.

DISCLOSURE OF THE INVENTION

The object of the invention is achieved by a concatenating/presenting method of concatenated table-format data, in which plural table-format data each expressed as an array of records containing an item and item values contained therein are concatenated and the concatenated table-format data is presented, the method characterized by comprising a step of constructing each of the table-format data to divide it into one or more information blocks each including a value list in which in order of item value numbers corresponding to item values belonging to a specific item, the item values are stored, and a pointer array in which pointer values for indicating the item value numbers are stored in order of unique record numbers, a step of finding an item to be made common to the plural table-format data, a step of specifying information blocks relating to the item to be made common, a step of comparing value lists contained in the specified information blocks in the plural table-format data to make both the value lists equivalent to each other, a step of, when the value lists are made equivalent, converting a pointer array in accordance with addition of an item value in the information block in which the item value is added and creating a new pointer array, a step of, with respect to the plural table-format data and among the information blocks relating to the specific item, deciding on table-format data in which default sort order is reflected at presentation to be master table format data, and deciding on table-format data other than that to be slave table-format data, a step of, in the information block which constitutes the slave table-format data and in which the item value becomes equivalent, creating a slave side existence number array for storing an existence number indicating the number of records relating to the slave table-format data correspondingly to the item value, a step of referring to the existence number in the slave side existence number array and creating a slave side accumulation number array storing an accumulation number of the existence numbers corresponding to the item value, a step of, in the information block which constitutes the master table-format data and in which the item value becomes equivalent, extracting a pointer value in the pointer array indicated by a master side record number, a step of specifying an element in the slave side existence number array indicated by the pointer value, making it correspond to a master side record number, and placing it in a record number indication array indicating the number of records of the slave table-format data corresponding to each record of the master table-format data, a step of referring to the number of records in the record number indication array and creating a master side accumulation number array for storing an accumulation number of the number of records corresponding to the master side record number, a step of obtaining a total sum of the accumulation number of the number of records with respect to the master side accumulation number array and creating a new record number array capable of containing the total sum number of elements and for specifying a new record relating to the concatenated table-format data, a step of obtaining a first resultant array containing a record number in the master table-format data in view of duplication by comparing a new record number in the new record number array with an element in the master side accumulation number array, a step of specifying an element in the pointer array relating to the slave table-format data indicated by the record number in the master table-format data as an element in the first resultant array, a step of specifying an element in the slave side accumulation number array indicated by the element in the pointer -array relating to the slave table-format data and temporarily holding it as a slave side start address, and a step of obtaining a second resultant array containing a record number in the slave table-format data in view of duplication from a record number in the record number array, an element in the master accumulation number array specified by the record number, and the slave side start address, wherein an item value in the value list relating to the master side information block is extracted on the basis of the record number contained in the first resultant array, and an item value in the value list of the slave side information block is extracted on the basis of the record number contained in the second resultant array.

The principle of the invention will be described below. In the case where the table-format data are concatenated, in both the master side and the slave side, what is expressed on one row before concatenation appears on one or plural rows. Accordingly, a method of mapping the one original row to the plural rows must be found. For example, a most primitive method of realizing this is to copy the record the plural number of times. For example, when an array of a record number is originally (0, 1, 2), and when each record is copied twice, (0, 0, 1, 1, 2, 2) is obtained. However, it takes an extremely long time to copy the record.

Then, it is conceivable to use an array (repeat number array) containing the number of times that each record should be copied, that is, should be repeated. In the above example, the repeat number array becomes (2, 2, 2). In order to decide a row of the concatenated view (table) by using this repeat number array, for example, calculation as described below becomes necessary.

For example, when it is desired to know a third row of the concatenated table, on the basis that the first element =2 of the repeat number array does not reach "3", and the first element+second element of the repeat number array=4 reaches "3", it is understood that the record at the master side second row corresponds to the third row in the concatenated table.

In the invention, an accumulation number array is previously obtained, so that the above calculation can be omitted. That is, the repeat number can be calculated very easily from the accumulation number array. More particularly, the new record number in the new record number array and the element in the master side accumulation number array are compared with each other, so that the first resultant array containing the record number in the master table-format data in view of duplication can be obtained. The second resultant array containing the record number in the slave table-format data in view of duplication can also be obtained from the value in the first resultant array, the value in the master side accumulation number array and the like.

Besides, the object of the invention is achieved by a concatenating/presenting method of concatenated table-format data, in which plural table-format data each expressed as an array of records containing an item and item values contained therein are concatenated and the concatenated table-format data is presented, the method characterized by comprising:

a step of constructing each of the table-format data to divide it into one or more information blocks each including a value list in which in order of item value numbers corresponding to item values belonging to a specific item, the item values are stored, and a pointer array in which pointer values for indicating the item value numbers are stored in order of unique record numbers, a step of finding an item to be made common to the plural table-format data, a step of specifying information blocks relating to the item to be made common, a step of comparing value lists contained in the specified information blocks in the plural table-format data to make both the value lists equivalent to each other, a step of, when the value lists are made equivalent, converting a pointer array in accordance with addition of an item value in the information block in which the item value is added and creating a new pointer array, a step of, with respect to the plural table-format data and among the information blocks relating to the specific item, deciding on table-format data in which default sort order is reflected at presentation to be master table format data, and deciding on table-format data other than that to be slave table-format data, a step of, in the information block which constitutes the slave table-format data and in which the item value becomes equivalent, creating a slave side existence number array for storing an existence number indicating the number of records relating to the slave table-format data correspondingly to the item value, a step of referring to the existence number in the slave side existence number array and creating a slave side accumulation number array storing an accumulation number of the existence numbers corresponding to the item value, a step of, in the information block which constitutes the master table-format data and in which the item value becomes equivalent, extracting a pointer value in the pointer array indicated by a master side record number, a step of specifying an element in the slave side accumulation number array on the basis of the pointer value, making it correspond to the master side record number, and placing it in a record number indication array indicating the number of records of the slave table-format data corresponding to respective records of the master table-format data, the number of records being for an item value which is not larger than the item value in the value list indicated by the pointer value or less than the item value in sort order of the master side value list, a step of referring to the number of records in the record number indication array and creating a master side accumulation number array for storing an accumulation number of the numbers of records corresponding to the master side record number, a step of obtaining a total sum of the accumulation number of the number of records with respect to the master side accumulation number array and creating a new record number array capable of containing the total sum number of elements and for specifying a new record relating to the concatenated table-format data, a step of obtaining a first resultant array containing record numbers in the master table-format data in view of duplication by comparing a new record number in the new record number array with an element in the master side accumulation number array, a step of specifying an element in the pointer array relating to the slave table-format data and indicated by the record number in the master table-format data as the element in the first resultant array, a step of specifying an element in the slave side accumulation number array indicated by the element in the pointer array relating to the slave table-format data and temporarily holding it as a slave side start address, and a step of obtaining a second resultant array containing record numbers in the slave table-format data in view of duplication from the record number in the record number array, the element in the master accumulation number array specified by the record number, and the slave side start address, wherein the item value in the value list relating to the master side information block is extracted on the basis of the record number contained in the first resultant array, and the item value in the value list of the slave side information block is extracted on the basis of the record number contained in the second resultant array.

By this, it becomes possible to create the table (view) containing the slave side item values which become the master side item value or less in the sort order of the concatenated items, or the slave side item values which becomes less than the master side item value.

For example, in order to acquire those not larger than the master side item value, there is provided a step of specifying an element in the slave side accumulation number array corresponding to a value larger by one than a value indicated by the pointer value, and placing, by this, it in a record number indication array indicating the number of records of the item value which is not larger than the item value in the value list indicated by the pointer value in sort order of the master side value list.

In a preferred embodiment, the step of creating the first resultant array includes a step of specifying a position where an element in the master accumulation number array, whose value is not larger than the new record number and is maximum, is stored, and a step of specifying an element in the new record number array indicated at the position and arranging it to a corresponding position in the first resultant array.

Besides, in a more preferable embodiment, the step of creating the second resultant array includes a step of calculating a difference between the record number in the record number array and the element in the master accumulation number array which is not larger than the new record number and is maximum, a step of adding the element temporarily held as the start address and the calculated difference, and a step of arranging a value obtained by the addition to a corresponding position in the second resultant array.

Besides, the object of the invention is achieved by a program for causing a computer to execute the above steps.

BRIEF DESCRIPTION OF THE DRAWINGS

FIG. 3A is a view showing an example of table-format data, and

FIGS. 3B to 3D are views respectively showing examples of information blocks based on the table-format data.

FIG. 4A is a view showing another example of table-format data, and

FIGS. 4B and 4C are views respectively showing other examples of information blocks based on the table-format data.

FIG. 5 is a flowchart showing a retrieving method relating to a single item.

FIGS. 6A and 6B are views showing a relation between a record number and an item value with respect to a certain item, and a completed information block of the embodiment.

FIGS. 8A and 8B are views for explaining original data of table-format data and data extracted from this, respectively.

FIG. 9 is a view showing a joined table (view) based on the table-format data shown in FIGS. 8A and 8B.

FIG. 11A is a view showing a structure of an information block of table-format data according to the embodiment, and FIG. 11B is a view showing extracted table-format data.

FIG. 12A is a view showing a structure of an information block of other table-format data according to the embodiment, and FIG. 12B is a view showing extracted table-format data.

FIG. 15 is a view for explaining an information block at the sharing processing according to the embodiment.

FIG. 16 is a view for explaining the sorting of slave side table-format data in the embodiment.

FIG. 18 is a view for explaining an array of master side table-format data necessary for creation of a table (view) in the embodiment.

FIG. 24 a view showing a state in which a master side and a slave side record numbers are specified in the embodiment.

FIG. 25 is a view for explaining the acquisition of a view joined on the basis of the obtained record numbers in the embodiment.

PREFERRED MODE FOR CARRYING OUT THE INVENTION

Figure 1:
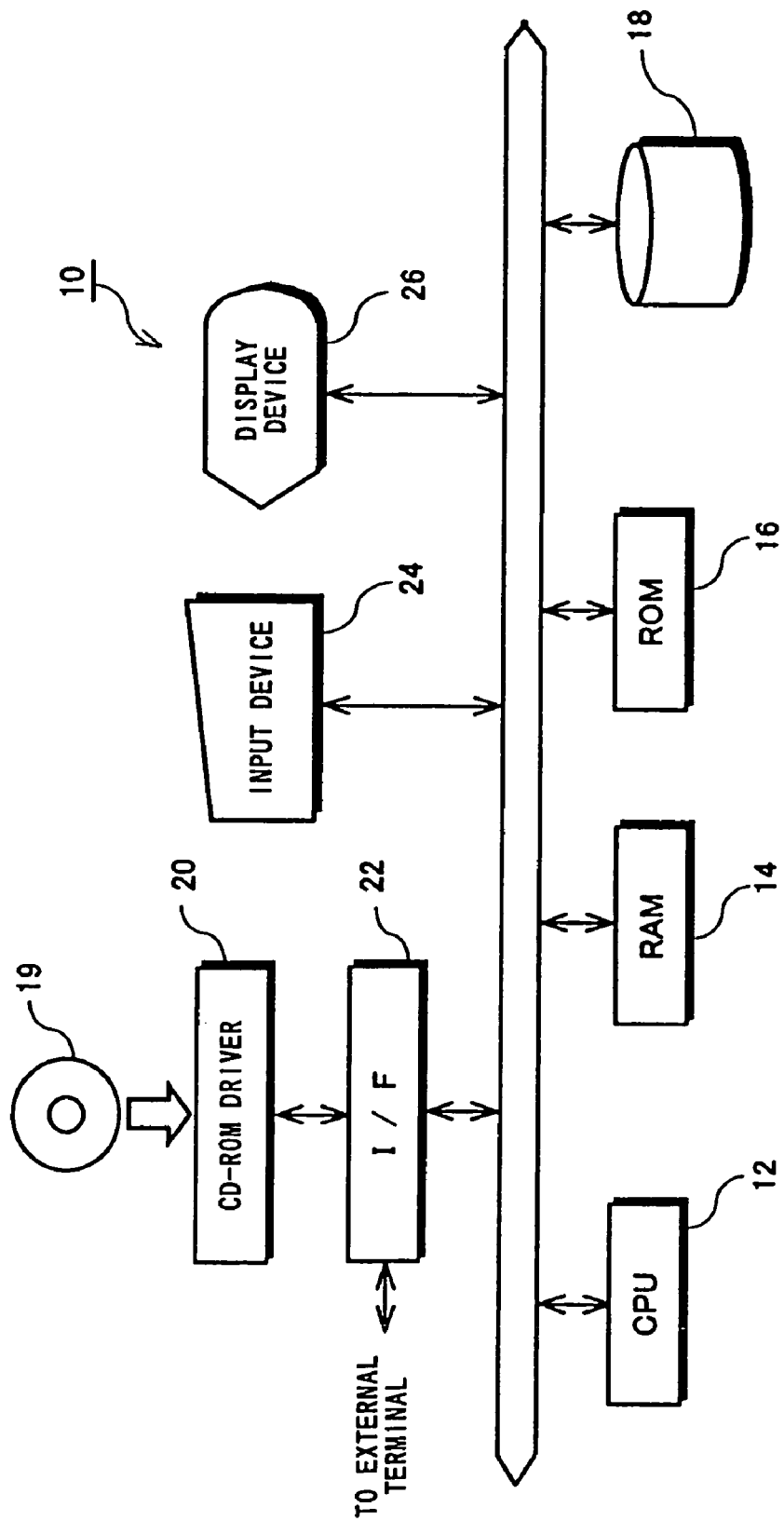
FIG. 1 is a block diagram showing a hardware configuration of a computer system which can realize a retrieving, tabulating and searching method according to an embodiment of the invention.

Hereinafter, an embodiment of the present invention will be described with reference to the accompanying drawings. FIG. 1 is a block diagram showing a hardware configuration of a computer system which can realize the joining of table-format data according to the embodiment of the invention, and the retrieving, tabulating and sorting of the joined data. As shown in FIG. 1, this computer system 10 has a similar configuration to a normal one, and includes a CPU 12 for controlling the whole system and respective components by executing a program, a RAM (Random Access Memory) 14 for storing work data and the like, a ROM (Read Only Memory) 16 for storing the program and the like, a fixed storage medium 18 such as a hard disk, a CD-ROM driver 20 for accessing a CD-ROM 19, an interface (I/F) 22 provided between the CD-ROM driver 20 and an external terminal connected to an external network (not shown), an input device 24 including a keyboard and a mouse, and a CRT display device 26. The CPU 12, the RAM 14, the ROM 16, the external storage medium 18, the I/F 22, the input device 24 and the display device 26 are mutually connected through a bus 28.

A program for concatenating (joining) table-format data according to this embodiment, a program for creating a table (view) of specified items from the concatenated table-format data, a searching program, a tabulating program and a sorting program are contained in the CD-ROM 19, and may be read by the CD-ROM driver 20, or may be previously stored in the ROM 16. Besides, what is once read out of the CD-ROM 19 may be stored in a specified area of the external storage medium 18. Alternatively, the program may be supplied from the outside through the network (not shown), the external terminal and the I/F 22.

Besides, in this embodiment, in order to realize searching, tabulating and sorting at high speed, as described later, it is necessary to create an information block of a specified data format. This information block creation program may also be stored in-the CD-ROM 19, stored in the ROM 16, or stored in the external storage medium 18. Alternatively, these programs may be naturally supplied from the outside through the network (not shown). Besides, in this embodiment, the data (information block) created by the information block creation program is stored in the RAM 14 or stored in a specified area of the external storage medium 18.

Next, a description will be given to a data format as the premise of the invention, and the principle of searching, tabulating and sorting. The present inventor contrived the construction of table-format data having a specific data format, and a searching, tabulating and sorting method last year, in order to realize a super high speed processing (see PCT/WO00/10103). Also in the present invention, the table-format data is basically constructed as an aggregate of specified information blocks based on this application, and the searching, tabulating and sorting are realized by using this. First, a brief description will be given to the structure of the information block and the searching using this.

Figure 2:
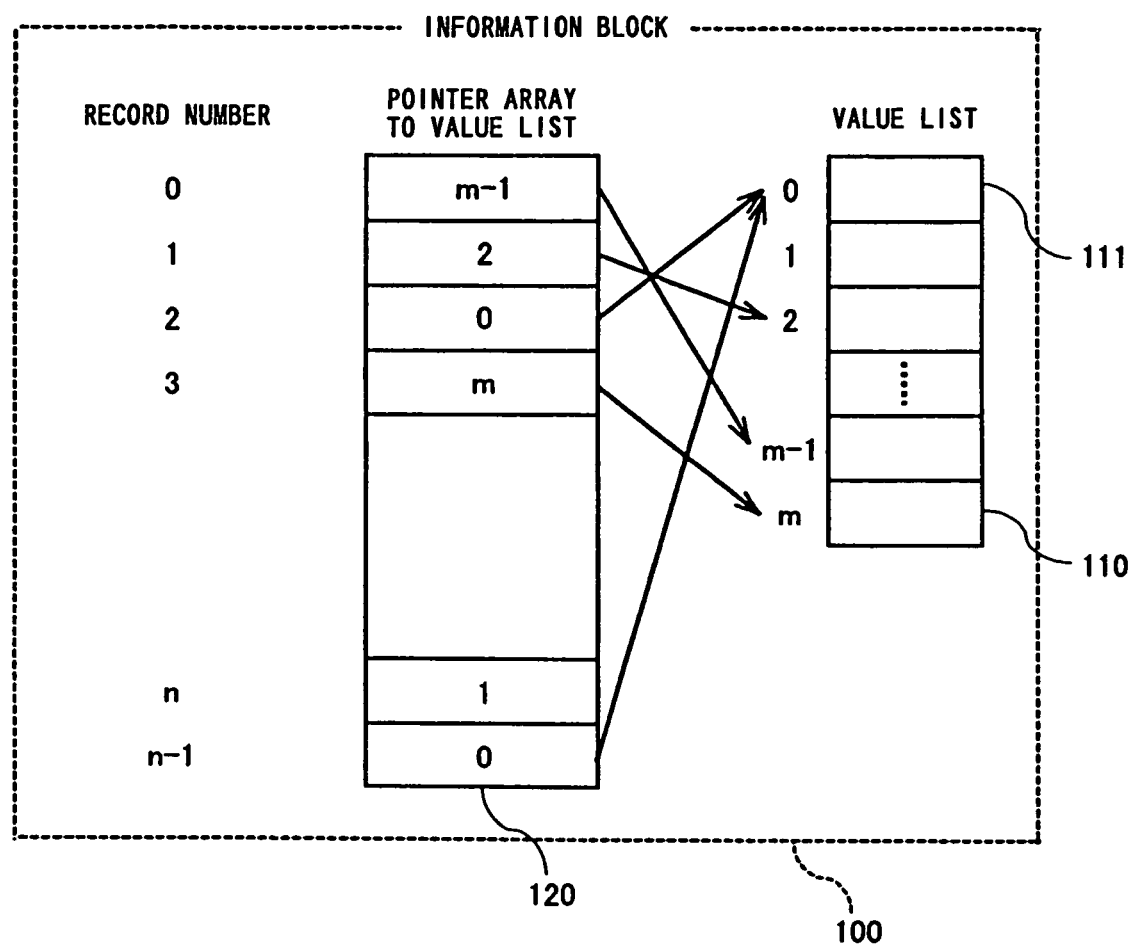
FIG. 2 is a view showing an information block used in the embodiment.

FIG. 2 is a view showing the information block used in this embodiment. As shown in FIG. 2, an information block 100 includes a value list 110, and a pointer array 120 to the value list. The value list 110 is a table in which with respect to each item of table-format data, item values belonging to the item are stored in the order of ordered (integer) item value numbers and the item values 111 corresponding to the item value numbers are stored. The pointer array 120 to the value list is an array in which the item value numbers of a certain column (that is, an item) of the table-format data, that is, pointers to the value list 110 are stored in the order of record numbers of the table-format data.

By combining the pointer array 120 to the value list and the value list 110, when a certain record number is given, an item value number stored correspondingly to the record number is extracted from the pointer array 120 to the value list relating to the specified item, and next, the item value stored correspondingly to the item value number in the value list 110 is extracted, so that the item value can be obtained from the record number. Accordingly, similarly to a conventional data table, all data (item values) can be referred to by using a coordinate of the record number (row) and the item (column).

For example, table-format data shown in FIG. 3A will be considered. In this example, various item values are given to items of a customer ID, a customer name, and a telephone number. In this embodiment, the table-format data as stated above is held as information blocks of formats shown in FIGS. 3B to 3D. For example, in FIG. 3B, a pointer array 120-1 is associated with a value list 110-1 storing item values indicating customer IDs. That is, a pointer value of the pointer array at a leading record (record number "0") is 0, and an item value "1" indicating the customer ID is obtained correspondingly to this. In FIG. 3C, a pointer array 120-2 is associated with a value list 110-2 storing item values indicating the customer names. For example, a pointer value of the pointer array at a leading record (record number "0") is "5", and an item value "King" indicating the customer name is obtained correspondingly to this. Also in FIG. 3D, it is understood that a pointer array 120-3 is similarly associated with a value list 110-3 storing item values indicating the telephone numbers. Besides, it is understood that in each of the value lists, the item values are ordered (in this example, ascending order).

Further, in this embodiment, a value management table of the information block 100 includes, in addition to the value list 110, a class number flag array used for searching and tabulation, a start position array indicating a start address of a memory space in which pointers corresponding to item values are to be stored, and an existence number array. The respective flags of the class number flag array, and the respective existence numbers of the existence number array are made to correspond to the respective item values. A flag value of the class number flag is normally "0", and is set to "1" correspondingly to an item value to be found at the searching or tabulation. Besides, the existence number corresponds to the number of records having the item value. Incidentally, since the start position corresponds to what is obtained by adding the existence numbers corresponding to pointer values smaller than the corresponding pointer value, it is not always necessary to provide the start position.

FIG. 4A is a view showing another example of table-format data, and FIGS. 4B and 4C are views showing information blocks respectively relating to "gender" and "age". As shown in FIG. 4B, in a value management table 210-1 of an information block 200-1 relating to the gender, there are shown item values ("male" and "female") corresponding to respective pointer values of a pointer array 220-1, and class numbers, start positions and existence numbers corresponding to the respective item values. For example, the number of records in which the pointer value is "0" (that is, the item value of the value list is "male") is 632564, while the number of records in which the pointer value is "1" (that is, the item value of the value list is "female") is 367436. Besides, the start positions corresponding to the respective item values indicate start addresses of a pointer array 230-1 to records. It is understood that the same applies to FIG. 4C.

An example of searches using the information block having the data structure as stated above will be described below. FIG. 5 is a flowchart showing a searching method relating to a single item. The CPU 12 (see FIG. 1) executes a specified searching program so that this processing is realized. In this example, records in which the item value of "age" is the age of sixteen or the age of nineteen are searched. First, among information blocks relating to the table-format data, an information block 200-2 shown in FIG. 4C and relating to "age" is specified (step 501).

Next, in a value list 210-2 of the specified information block (hereinafter referred to as "specified information block"), a class number of a row corresponding to an item value which meets the search condition (the age of sixteen or the age of nineteen) is set to "1" (step 502). In the case of this example, the class numbers of rows corresponding to the item value number "0" and the item value number "3" are set to 1. Next, the start position and the existence number corresponding to the row in which the class number is set to "1" are acquired (step 503). The information is referred to as pointer extraction information. In the pointer array to records, a record number indicating a pointer to a record meeting the search condition is extracted on the basis of the pointer extraction information acquired at the step 503 (step 504). In this example, it is understood that pointers of records corresponding to the item value number "0" are stored in an area from the start position "0" of the pointer array to records, that is, the head to a 45898th position, while pointers of records corresponding to the item value number "3" are stored in an area for 189653 pointers from a 2383137th position of the pointer array to records. Finally, in order that they can be used in a later processing, an array of the extracted record numbers is created as a resultant set, and this is held (step 505).

Besides, tabulating and sorting can also be realized by using the class number, the start position and the existence number.

Next, a description will be given to a compile processing for creating the information block. In this compile processing, a value list is created in which data arranged at random concerning a certain item are sorted without duplication and in specified order (for example, in the order of the Japanese syllabary or in the order of alphabet). FIG. 6A is a view showing records and item values of a certain item (family name) in table-format data. In the compile processing of this embodiment, with respect to the item in which the item values are arranged at random as shown in FIG. 6A, an information block with a format as shown in FIG. 6B is created.

In FIG. 6B, an information block 600 includes a pointer array 601 (hereinafter referred to as "PV") to a value list, and a value list 602. Immediately after the compile processing, the value list 602 is constituted by an array (original item value array) 603 containing original item values and an array 604 (hereinafter referred to as "VLP") indicating storage position numbers of the original item value array 603. The pointer array (PV) can be said a position specifying array in a sense that it specifies item values in the value list. Besides, the VLP can be said an order specifying array in a sense that it indicates the order of item values. Although the information block immediately after the compile processing is slightly different from the information block shown in FIG. 3B in the format, it can be made to have an equivalent format by an after-mentioned processing.

Figure 7:
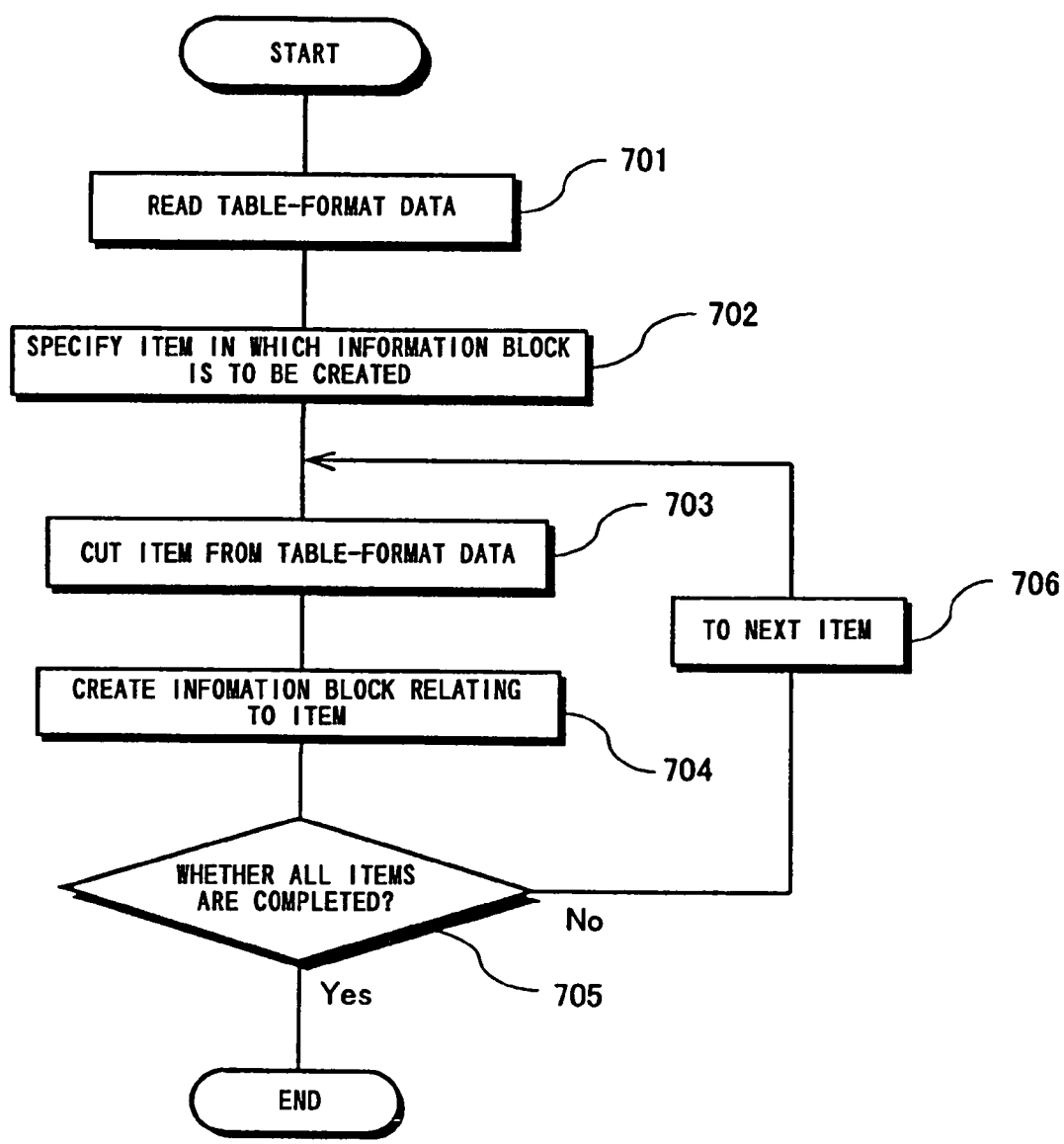
FIG. 7 is a flowchart showing the outline of a compile processing of the embodiment.

FIG. 7 is a flowchart showing the outline of the compile processing of this embodiment. As shown in FIG. 7, in the compile processing, the computer system 10 reads out the table-format data stored in the fixed storage medium 18 or the like (step 701), and specifies an item in which it is necessary to create an information block (step 702). For example, the information blocks may be created for all items, and only the information block relating to a specified arbitrary item may be created. Besides, it is desired that the read table-format data is temporarily stored in the RAM 14 in view of the processing time.

Next, the computer system 10 selects the specified item from the table-format data, and the data (item value) relating to the item is made to correspond to the record number and is cut (step 703). By this, for example, data of a format shown in FIG. 6A can be extracted. Next, the information block relating to the item is created (step 704). This processing will be described later in detail. The processing of the steps 703 and 704 is carried out with respect to all the specified items (see steps 705 and 706). By this, the information blocks relating to the specified items are completed.

In this way, it becomes possible to create the information blocks relating to the specified items. The creation of the information blocks is previously performed, and the processing of searching, tabulating and sorting is carried out by using the created information blocks.

Now, a description will be given below to a processing of combining two table-format data (execution of JOIN processing) and creating one table (view). Incidentally, in the present specification, in the information block, an array (item value array) in which item values concerning a certain item are arranged is referred to as a "value list". Besides, values contained in various arrays are referred to as "elements" according to circumstance.

For example, as shown in FIG. 8A, attention is paid to a certain item (here, "area") and a table 801 is created in which only members having a certain item value are extracted from a table (member table of a baseball fan club) 800. On the other hand, as shown in FIG. 8B, attention is paid to a certain item (here, "baseball field") and a table 811 is created in which only baseball fields having a specified item value are extracted from another table (for example, a baseball game schedule table) 810.

As shown in FIG. 8A, the member table 800 (called "member original table" since a set of records is extracted and the member table 801 is formed from this) has record numbers as member IDs and has items of "member name", "area", "baseball team name (fan) which a member likes", and values are given to the respective items in each record. On the other hand, as shown in FIG. 8B, the game schedule table 810 (similarly to the above, this is called "game schedule original table") has record numbers as baseball team IDs, and has items of "baseball team name", "game day", "baseball field name", and values are given to the respective items in each record.

In this embodiment, the item of the fan in the member table and the item of the baseball team in the game schedule table are used as keys to carry out the join processing, and finally, as shown in FIG. 9, a table showing games of the baseball team which the member likes and which are opened in the area of the member can be presented as a view (see numeral 900).

Incidentally, although the member table 801 and the game schedule table 811 are basically equal to each other, the table in which the default sort order of the output table (view) is reflected is referred to as "master table", and the other table is referred to as "slave table". The example of FIGS. 8A and 8B and FIG. 9 indicates a state in which the numbers (member IDs) given to the members are sorted, and the member table 801 becomes the master table, and on the other hand, the game schedule table 811 becomes the slave table. Besides, in the present specification, according to circumstances, the master table is referred to as master table-format data, and the slave data is referred to as slave table-format data.

Figure 10:
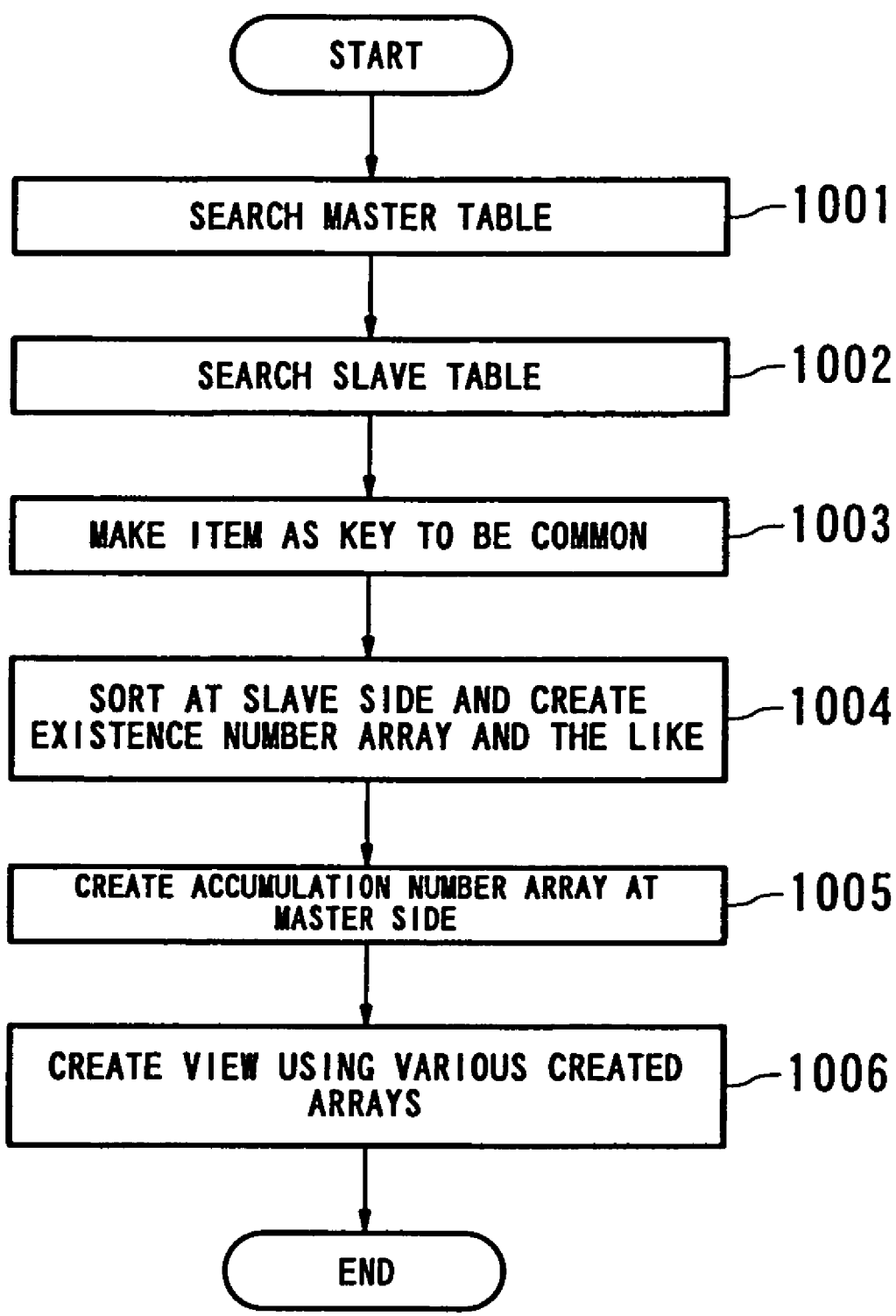
FIG. 10 is a flowchart showing the outline of a concatenating processing of table-format data according to the embodiment and a presenting processing.

FIG. 10 is a flowchart showing the outline of a join processing. First, records having a specified item value, for example, "Tokyo" in a certain item, for example, "area" are searched from the master table (step 1001), and then, similarly, records having a specified item value in a certain item are searched from the slave table (step 1002). In this search, the processing shown in FIG. 5 is performed. By the processing of the step 1001 and the step 1002, on the basis of the baseball fan club original table 800, the baseball fan club member table 801 can be formed (see FIG. 8A), and besides, the game schedule table 811 can be created from the game schedule original table 810 (see FIG. 8B).

For example, the baseball fan club original table is as shown in FIG. 11A. Here, there are initially information blocks 1101, 1102, and 1103 for the respective items of "member name", "area" and "fan". In the information block, there are provided a value list (for example, see reference numeral 1111) storing item values in the specified order (in the order of the Japanese syllabary or in the order of alphabet) and a pointer array (for example, see reference numeral 1112) storing pointer values corresponding to the respective record numbers and for specifying item value numbers in the item value table.

Besides, by the search processing, as shown in FIG. 11B, an ordered set array 1121 is created in which extracted record numbers are stored. Pointer values in the pointer array of each of the information blocks, and item values indicated by the pointer values can be specified by using the record numbers in the ordered set array. By this, a view including item values of the respective items, which are made to correspond to the extracted records, can be formed (see reference numeral 1122). Incidentally, in the processing of the join, it is not necessary to create the view 1122 and to present it to the user.

The game schedule original table is as shown in FIG. 12A. Here, there are initially information blocks 1201, 1202 and 1203 for the respective items of "baseball team", "game day" and "baseball field". In each of the information blocks, similarly to the baseball fan club member original table, a pointer array (for example, see reference numeral 1212) and a value list (for example, see reference numeral 1211) are provided. Besides, by the search processing, as shown in FIG. 12B, an ordered set array 1221 is formed in which extracted record numbers are stored.

Figure 13:
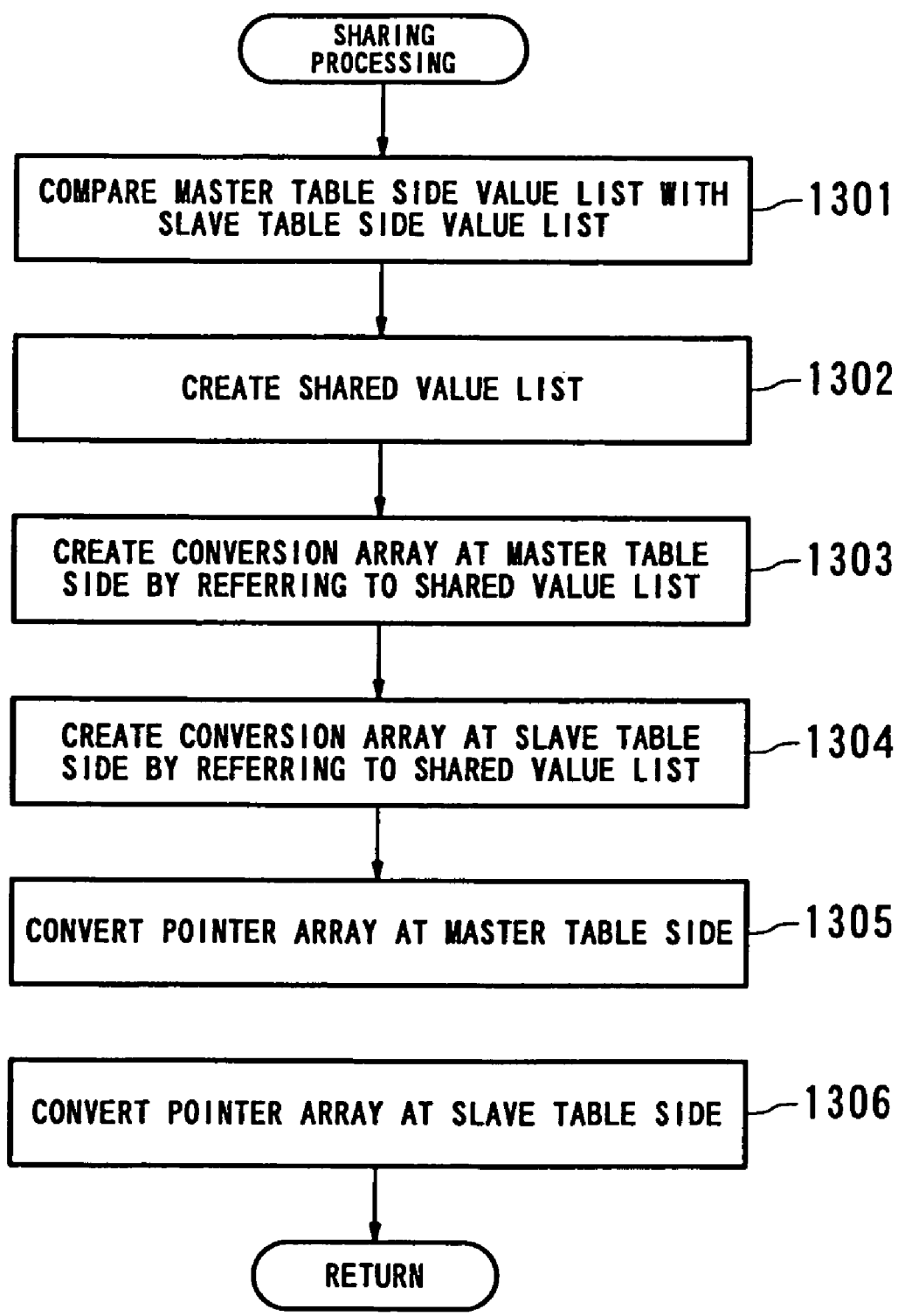
FIG. 13 is a flowchart showing a sharing processing according to the embodiment in more detail.

Next, an item as a key is made common (step 1003). FIG. 13 is a flowchart showing a sharing processing shown at the step 1003. As shown in FIG. 13, first, with respect to the item as the key, the value list at the master table side and the value list at the slave side are compared with each other (step 1301).

Figure 14A:
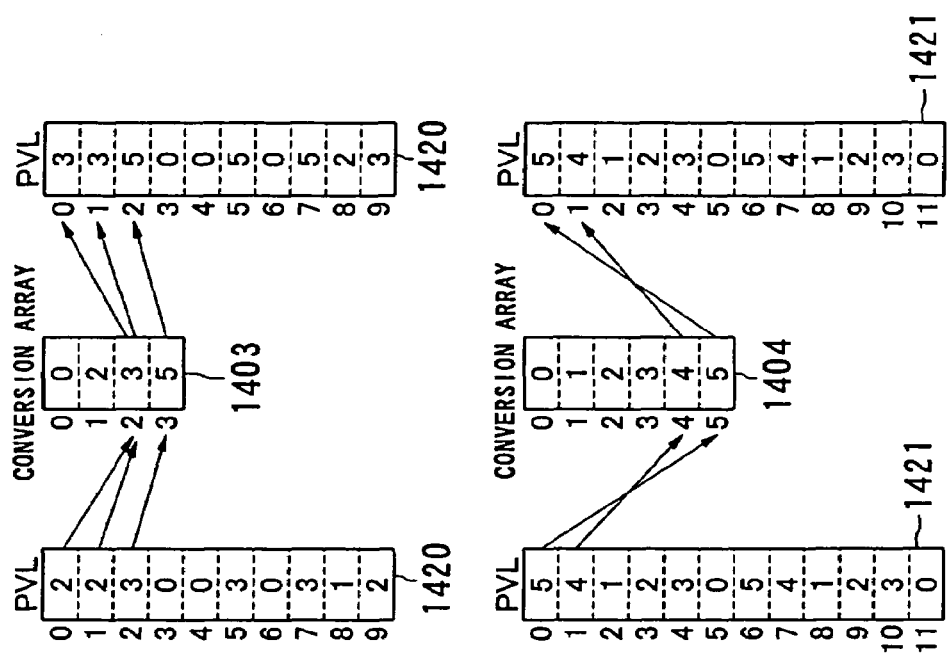
FIGS. 14A and 14B are views for explaining information blocks at the sharing processing according to the embodiment.

In the example shown in FIGS. 8A, 8B to FIGS. 11A, 11B, the item "fan" at the master table side and the item "baseball team" at the slave table side are made common. As shown in FIG. 14A, item values contained in a value list 1401 of an information block 1103 relating to the item "fan" at the master table side are compared with item values contained in the value list 1211 of the information block 1201 relating to the item "baseball team" at the slave table side (see an arrow 1410 in FIG. 14A).

A shared value list is created (step 1302, an arrow 1411 of FIG. 14A). The shared value list (see reference numeral 1402) has a form of logical product (AND) of the item values in the value list at the master table side and the item values in the value list at the slave table side.

Thereafter, a conversion array (see reference numeral 1403) between the value list at the master table side and the shared value list is created (step 1303). The conversion array 1403 at the master table side stores values indicating item values in the shared value list corresponding to the respective item values of the original value list. Similarly, a conversion array (see reference numeral 1404) between the value list at the slave table side and the shared value list is also created (step 1304).

Figure 14B:
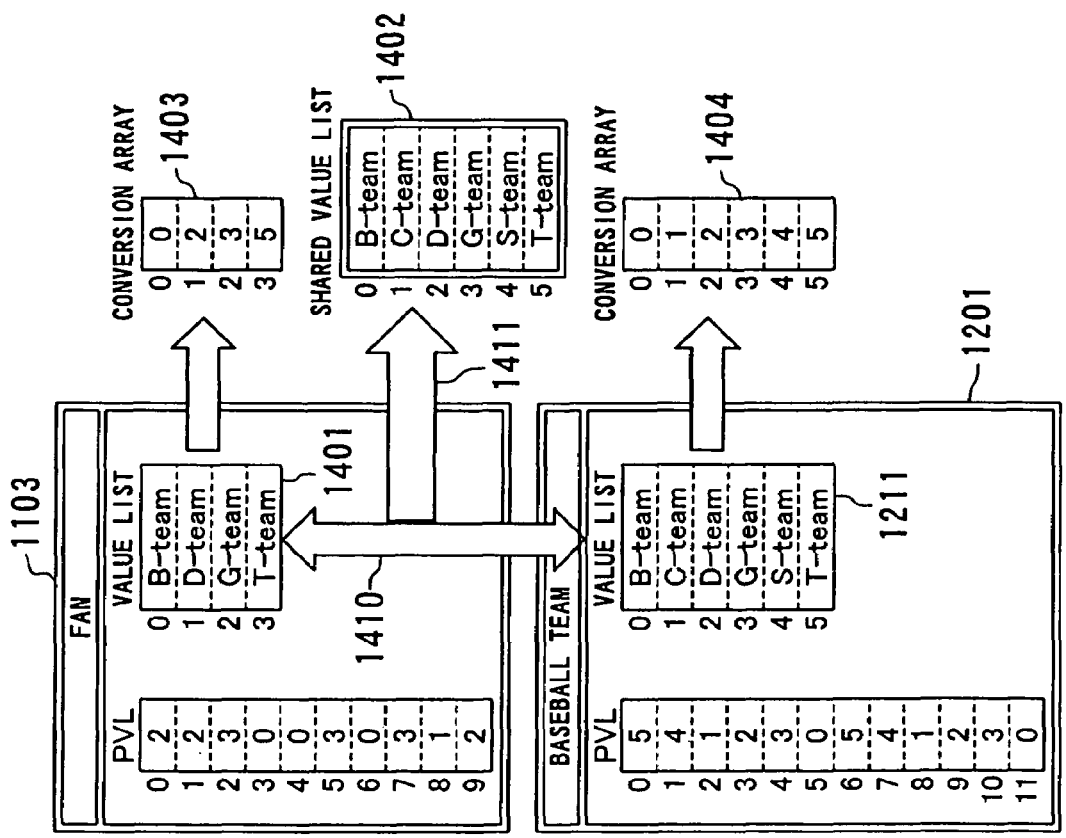

When the conversion array is created, pointer values in the pointer array at the master table side and pointer values in the pointer array at the slave table side are rewritten through the conversion arrays (steps 1305 and 1306). For example, as shown in FIG. 14B, at the master table side, reference is made to a pointer value of a certain storage position number, and reference is made to a value in the conversion array 1403 arranged at a position indicated by the pointer value. The reference value becomes a new pointer value of the storage position number in the pointer array. Similarly, also at the slave table side, reference is made to a pointer value of a certain storage position number in the pointer array 1421 and a value in the conversion array 1404 arranged at a position indicated by the pointer value is specified, and the value becomes a new pointer value of a storage position number.

In this way, as shown in FIG. 15, there are obtained an information block (see reference numeral 1501) at the master table side, which includes the pointer array whose pointer values are renewed and the shared value list, and an information block (see reference numeral 1502) at the slave table side, which includes the pointer array whose point values are renewed and the shared value list. Incidentally, in the state of FIG. 15, with respect to the item as the key, the value list is common. Accordingly, it is not necessary to keep two value lists, and both the information blocks may use the single value list.

When sharing of the value list is ended, at the slave table side, sorting is carried out according to the item as the key, and an existence number array is created which indicates the number of records having each item value in the value list with respect to the item as the key (step 1004 in FIG. 10). This sort processing will be described in brief. As shown in FIGS. 4B and 4C, the information block of this embodiment includes plural arrays each having the same element number as the number of item values in the value list. An explanation will be made again. A numerical value in the start position array indicates the start address of the pointer array to records, and a numerical value in the existence number array indicates the number of records indicating the item value.

FIG. 16 is a view for explaining a processing at the time when the slave side game schedule table is sorted while a baseball team name is used as a key. As shown in FIG. 16, in the information block relating to the baseball team name, there are a shared value list 1601, and a pointer array 1602 after conversion. In the game schedule table, only elements indicated by record numbers contained in an ordered set have only to be sorted.

Then, by reference to the pointer value in the pointer array indicated by the element in the ordered set, the element in an existence number array and at a position indicated by the pointer value is incremented, so that an examination is made on what number of times the value list is indicated. By this, it becomes possible to obtain an existence number array 1603.

Elements in an accumulation number array (this is the same as "start position array") 1604 can be decided from elements in the existence number array. This is obtained in such a manner that an accumulation number of elements in the existence number array is made an element at a storage position lower by one (that is, a storage position number is larger by one) in the start position array. For example, in the accumulation number array, an element at the third storage position number becomes a total sum of elements up to the second storage position number in the existence number array, that is, "1". Similarly, for example, an element at the fourth storage position number in the accumulation number array becomes a total sum of elements up to the third storage position number in the existence number array, that is, "1+2=3". Besides, an end position array 1605 indicates an after-mentioned pointer array 1606 to records. The respective elements are initially the same as those of the accumulation number array.

When the start position array and the existence number array are created in this way, the respective elements (record numbers) in the ordered set are extracted in the order of the storage position number. An item value in the value list 1601 is specified from the element in the pointer array indicated by the record number. When the item value in the value list is specified, an element in the end position array and at the storage position number where the item value is arranged is specified. The element becomes a value in the pointer array to records. Besides, the relevant element in the end position array is incremented.

For example, in the ordered array, since the record number at the 0th storage position number is "0", the storage position number "0" is specified in the pointer array 1602 (see an arrow 1610). The pointer value corresponding to the storage position number is "5", and the fifth element "3" in the end position array becomes the element at the 0th storage position number (see reference numerals 1611 and 1612). Besides, the fifth element in the end position array is incremented and becomes "4" (see an arrow 1613). By repeating the processing as stated above, the pointer array to the records is formed.

Figure 17A:
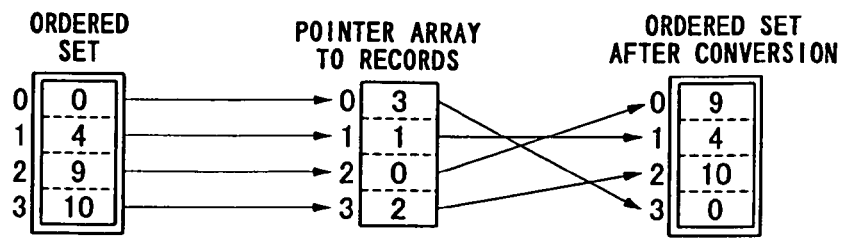
FIG. 17A is a view for explaining the sorting of slave side table-format data in the embodiment.
Figure 17B:
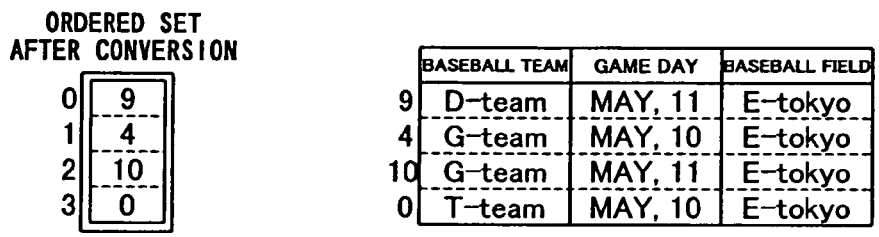
FIG. 17B is a view showing the sorted slave side table-format data.

When the pointer array to the records is used, as shown in FIG. 17A, the ordered set in which the record numbers are arranged can be converted. In this way, the ordered set after conversion is used, and in the order of the storage position numbers, the pointer array to the value list in the information block and elements in the value list are specified on the basis of the record numbers stored in the ordered set after conversion, so that a view shown in FIG. 17B and sorted by the baseball team name can be obtained.

In this way, after the creation (step 1004 of FIG. 10) of the existence number array and the like are ended, an accumulation number array relating to the master side is created (step 1005). Here, there are created a record number list indicating the number of slave side records correspondingly to an after-mentioned master side record number, and a master side accumulation number array in which record numbers are accumulated.

More particularly, by reference to a pointer value in a pointer array (see reference numeral 1802) indicated by a record number arranged in an ordered set (see reference numeral 1801 of FIG. 18) at the master side, a value at a storage position number indicated by the pointer value is specified in an existence number array (see reference numeral 1810) at the slave side. Next, an element (existence number) in the specified existence number array is arranged at a position relating to a storage position number where the initial record number is arranged in a record number list (see reference numeral 1803).

For example, in an example of FIG. 18, since the 0th element (record number) of the ordered set 1801 is "0", in the pointer array 1802, the pointer value "3" corresponding to "0" of the storage position number is extracted (see an arrow 1811). Next, in the existence number array 1810, the element "2" contained correspondingly to the storage position number "3" is extracted (see an arrow 1812), and this is stored as the "0"th element of the record number list 1803 (see an arrow 1813). By repeating the processing as stated above, the number of records at the slave side corresponding to the record number can be known for each record number in the ordered set 1811 at the master side.

When the existence number array is created, the accumulation number array at the master side on the basis of this is created. More particularly, the accumulation number of the element in the record number list has only to be made the element at the storage position lower by one (that is, the storage position number is larger by one) in the accumulation number array. For example, in the accumulation number array, "2" as the element at the 0th storage position number of the record number list is contained at the first position. "2+1=3" as the accumulation number up to the first storage position number of the record number list is contained at the second position. In this way, an accumulation number array 1804 at the master side can be obtained. Incidentally, a total sum of the numbers of records in the record number list 1803 is added in the accumulation number array 1804 at the master side (see reference numeral 1805). The total sum of the numbers of records becomes the total sum of the records of the view after the join. A record number after the join is called "a record number of a join table".

Figure 19:
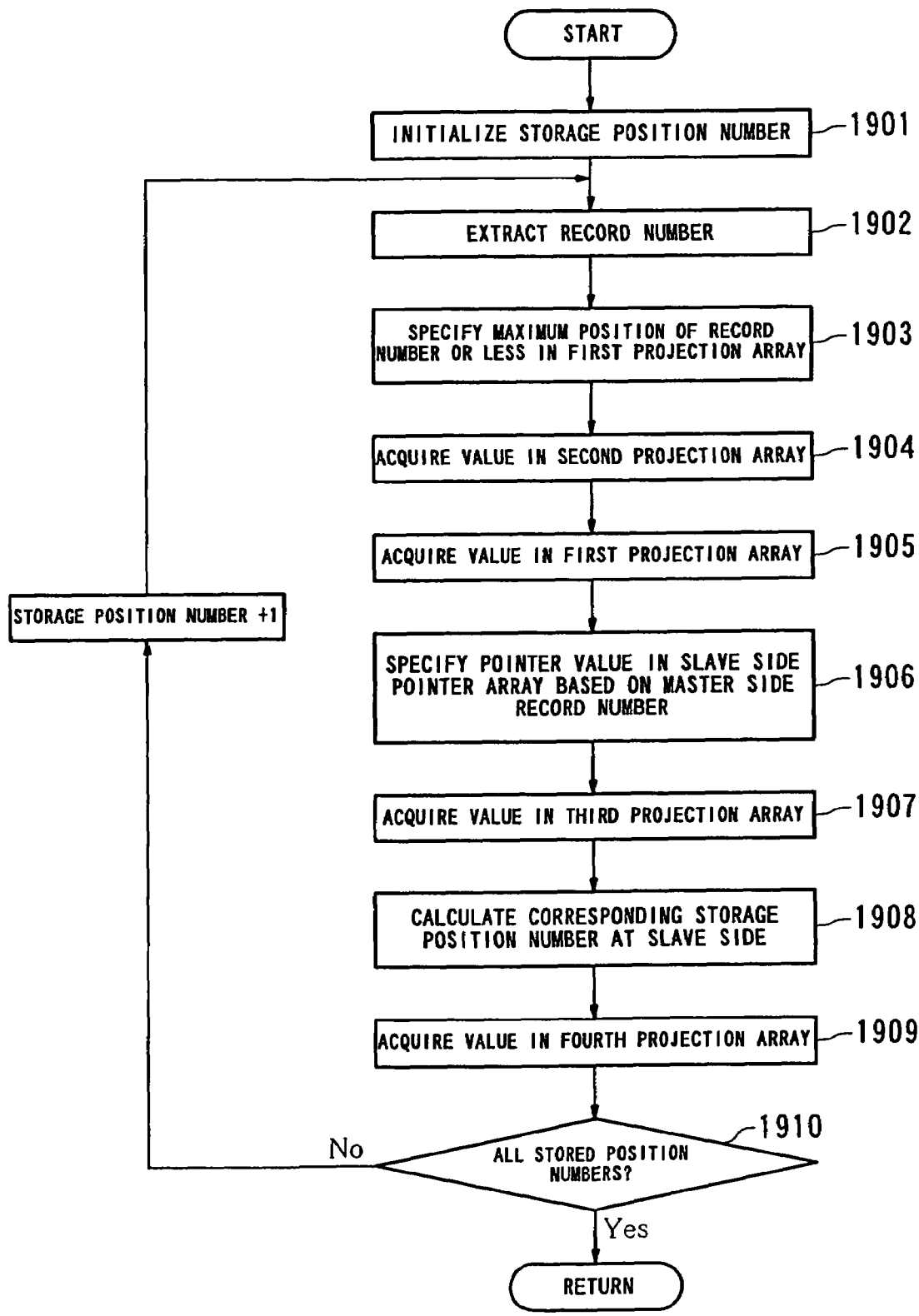
FIG. 19 is a flowchart showing a processing of specifying a master side record number and a slave side record number on the basis of a record number of a join table in order to obtain a view in the embodiment.

A processing to obtain a joined view is carried out by using the array created in this way. FIG. 19 is a flowchart showing a processing of specifying a master side record number and a slave side record number on the basis of the record number of the join table in order to obtain the view. Incidentally, in the processing shown in FIG. 19, among the various arrays formed at the step 1004 and the step 1005 of FIG. 10, the accumulation number array at the master side and the ordered set containing the record numbers at the master side are referred to as a first projection array and a second projection array, respectively. Besides, the accumulation number array at the slave side and the ordered set containing the record numbers at the slave side are referred to as a third projection array and a fourth projection array, respectively.

After storage position numbers for specifying the array containing record numbers of the join table are initialized (step 1901), the record number indicated by the storage position number is extracted (step 1902), and in the first projection array, a maximum position where its element is not larger than the extracted record number is specified (step 1903).

Figure 20:
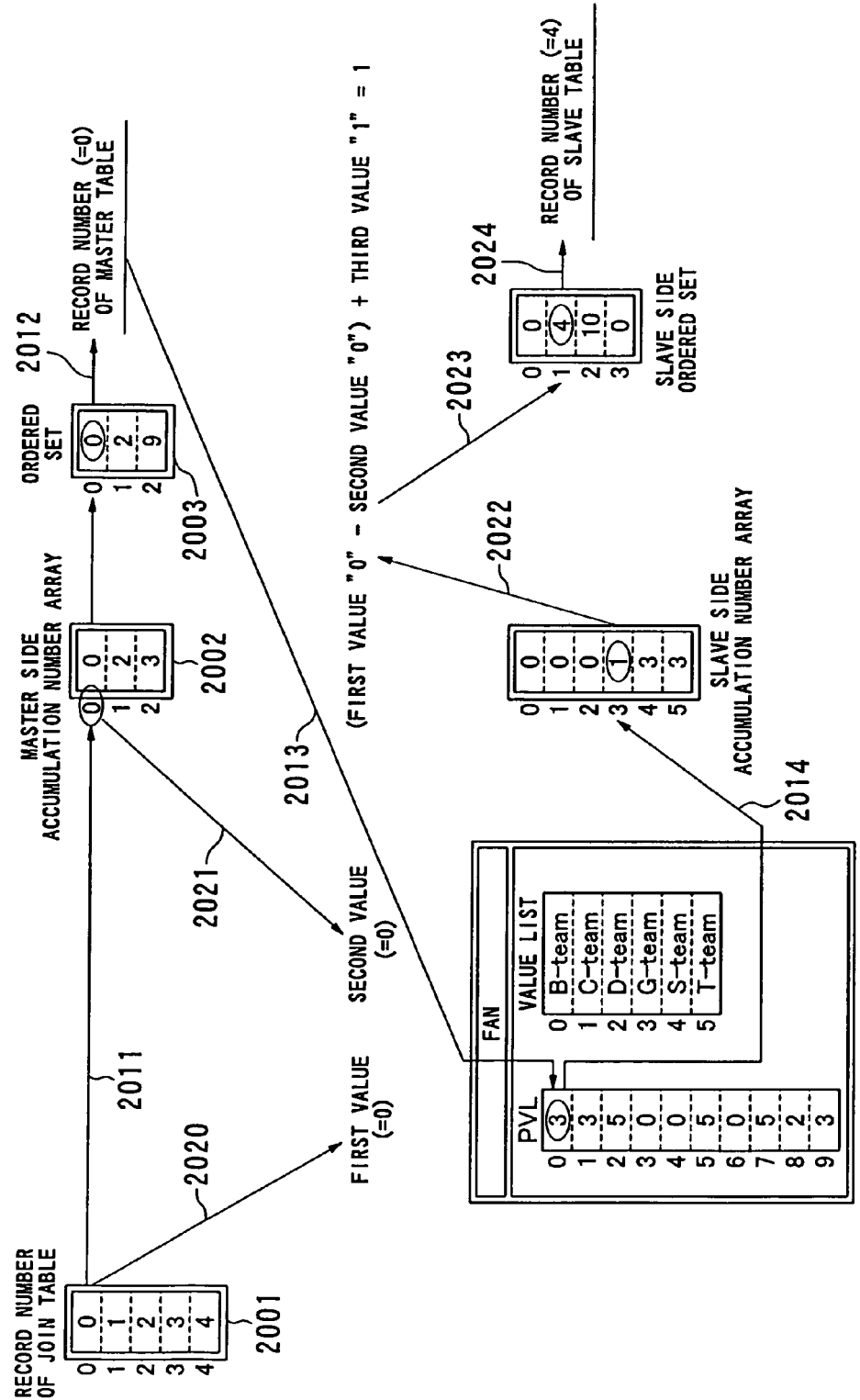
FIG. 20 is a view showing a state in which a master side and a slave side record numbers are specified in the embodiment.
Figure 21:
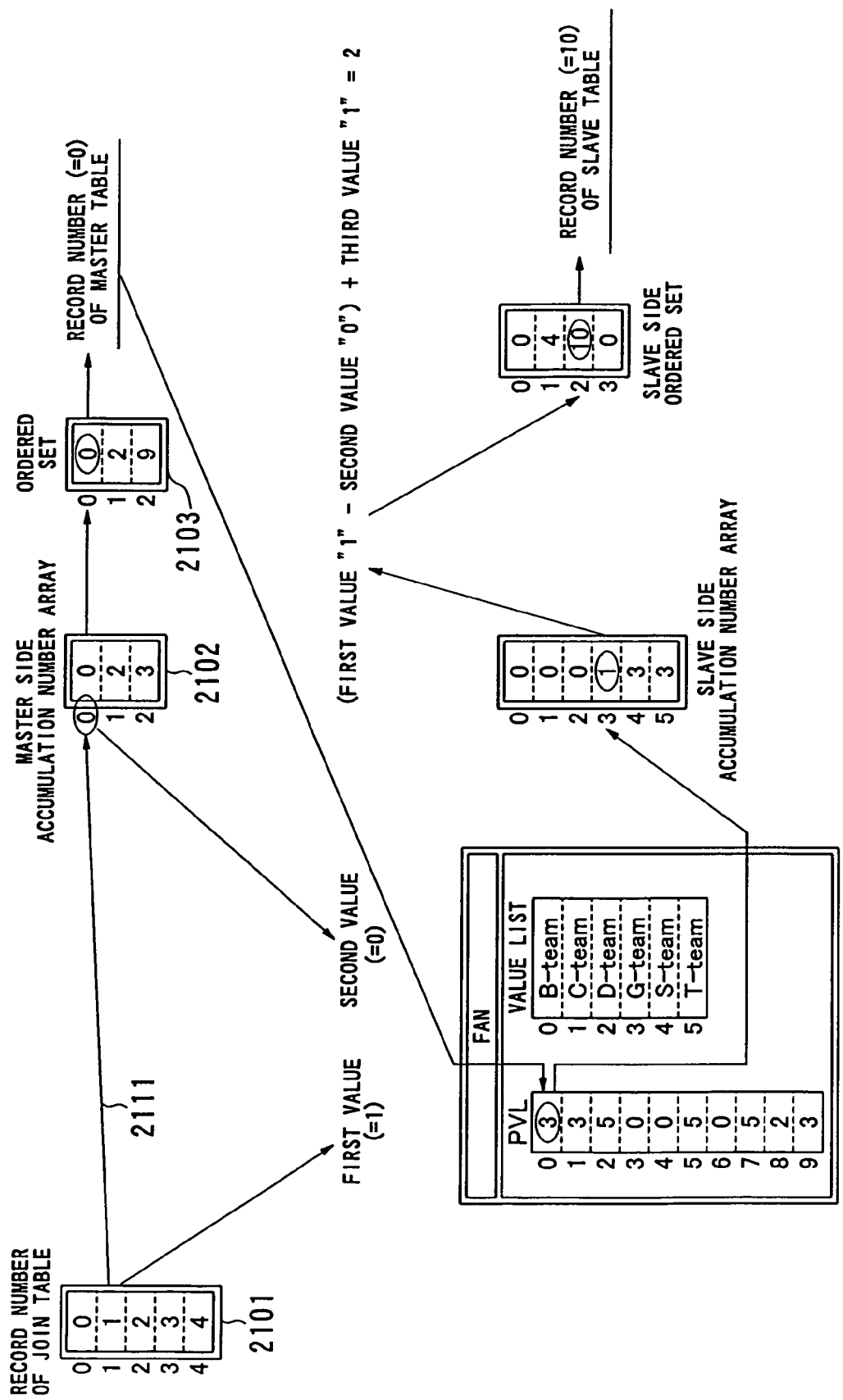
FIG. 21 is a view showing a state in which a master side and a slave side record numbers are specified in the embodiment.

For example, as shown in FIG. 20, a 0th record number "0" is initially extracted from an array 2001 containing record numbers of the join table. In a first projection array 2002, since an element having a record number "0" or less is "0", the maximum position becomes the 0th position where "0" is contained (see an arrow 2011). Besides, as shown in FIG. 21, a first record number "1" is extracted from an array 2101 containing record numbers of the join table. In a first projection array 2102, since an element whose record number is "1" or less is "0", a maximum position becomes a 0th position where "0" is contained (see an arrow 2111).

Figure 22:
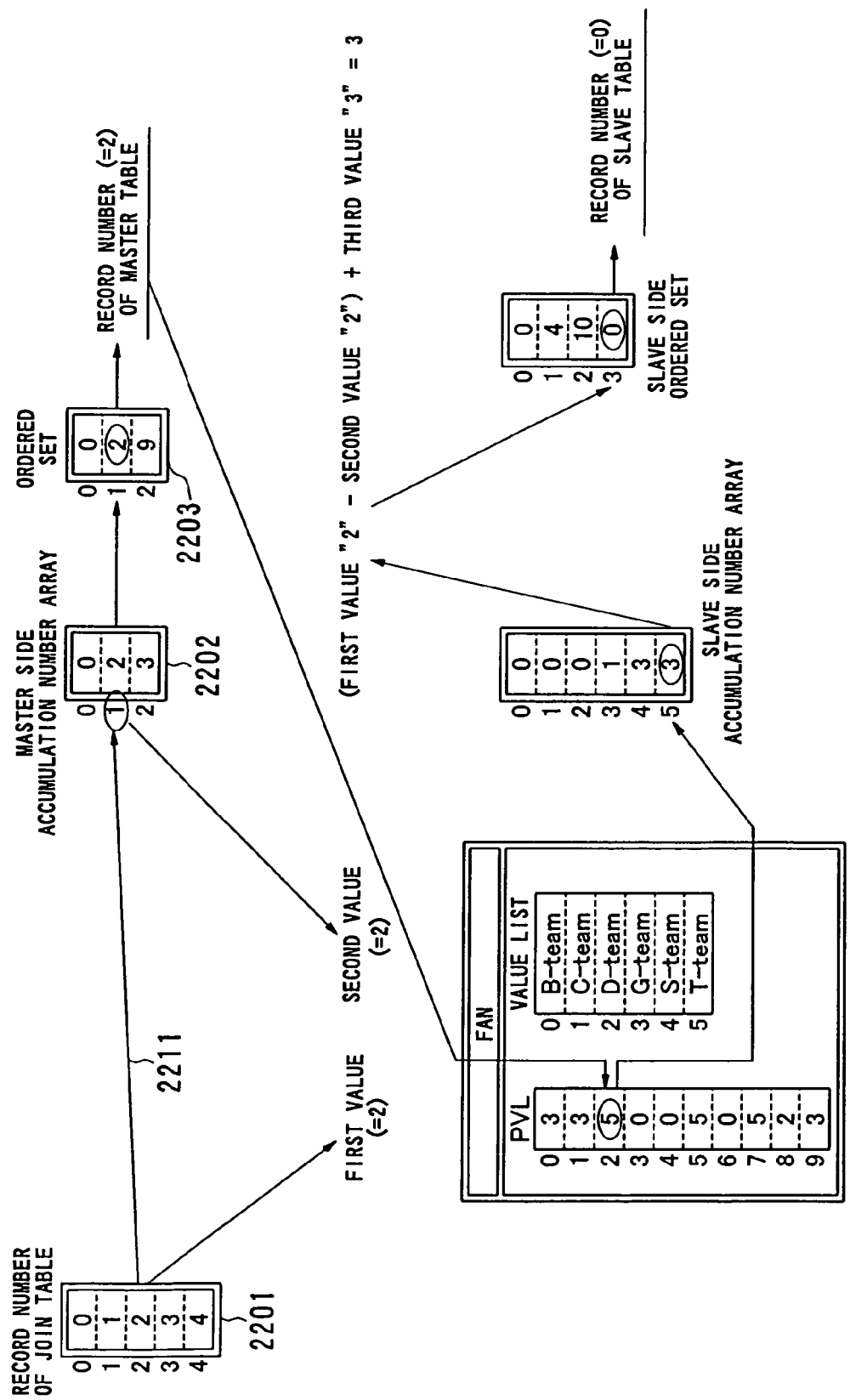
FIG. 22 a view showing a state in which a master side and a slave side record numbers are specified in the embodiment.
Figure 23:
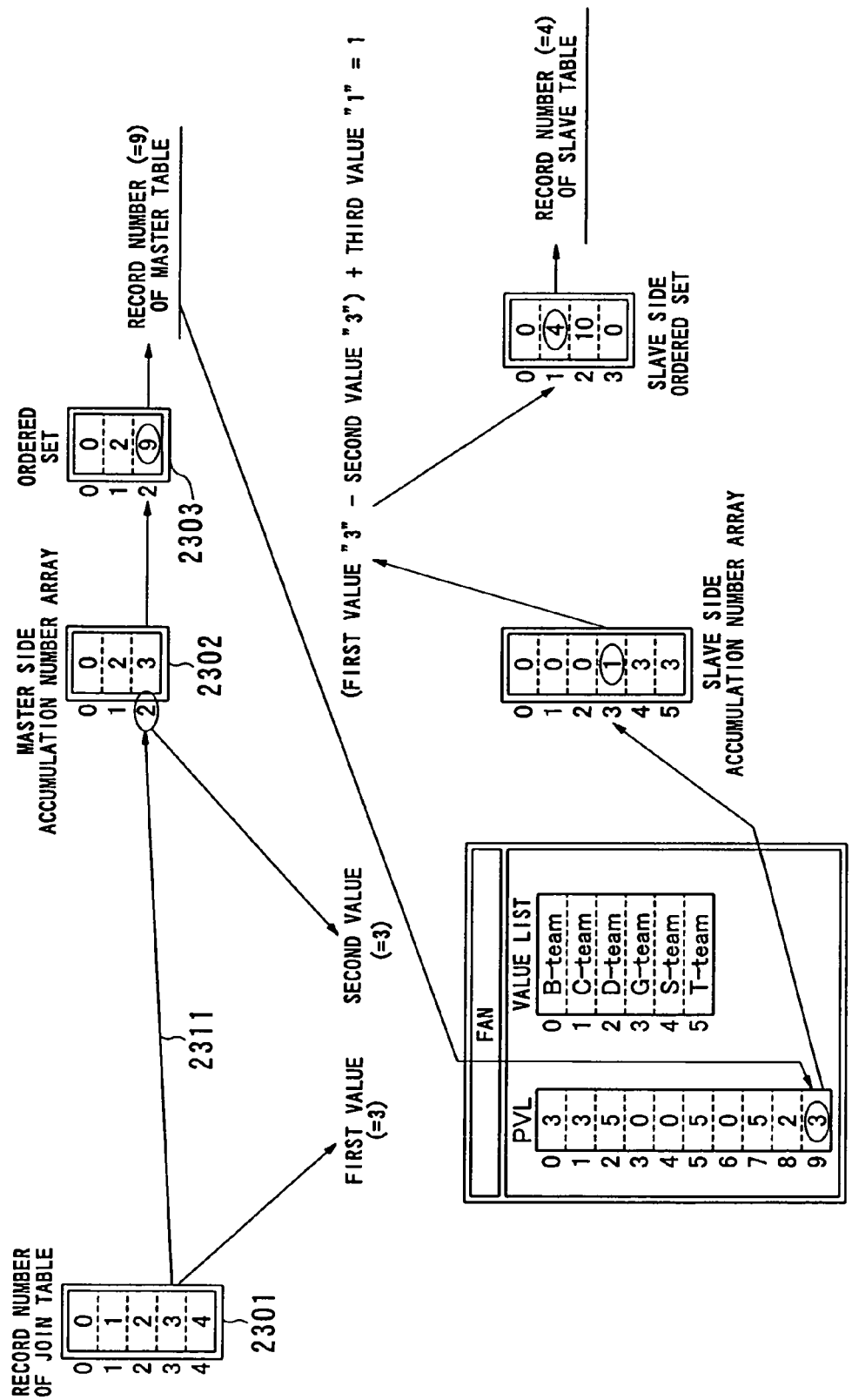
FIG. 23 a view showing a state in which a master side and a slave side record numbers are specified in the embodiment.

On the other hand, in FIG. 22, in the case where a second record number "2" is extracted from an array 2201 containing record numbers of the join table, in a first projection array 2202, an element having a record number "2" or less is "2. Accordingly, a maximum position becomes the first position where "2" is contained in the first projection array (see an arrow 2211).

Next, a value in a second projection array corresponding to the position acquired at the step 1903 is acquired (step 1904). The value in the second projection array becomes a record number at the master side. When the record number at the master side is obtained, in the pointer array at the slave side, the pointer value at a position indicated by the record number is extracted by using the record number (step 1906). Next, in a third projection array, a value at a position indicated by the pointer value is acquired (step 1907).

For example, in FIG. 20, the value "0" in the second projection array corresponding to the position (0th) acquired at the step 1903 becomes the record number at the master side (see an arrow 2012). Besides, the pointer value "3" in the pointer array arranged at the position indicated by the record number "0" at the master side is extracted (see an arrow 2013).

In the third projection array, the value arranged at the position indicated by the pointer value acquired at the step 1907 is acquired (step 1908). In the example of FIG. 20, the value "1" in the third projection array at the position corresponding to the pointer value "3" is acquired (see an arrow 2014). In this way, by using various acquired values, the record numbers at the slave side are calculated.

More particularly, there are used the record number (first value) of the join table acquired at the step 1902, the value (second value) in the first projection array corresponding to the position specified at the step 1903, and the value (third value) in the third projection array acquired at the step 1907. Here, (first value−second value)+third value is calculated, so that the storage position number of the ordered set at the slave side is obtained (step 1908). The value obtained here is made the storage position number and the position of the ordered set is specified, so that it becomes possible to acquire the record number at the slave side (step 1909). In the example shown in FIG. 20, since "0" (see an arrow 2020) as the first value, "0" (see an arrow 2021) as the second value, and "1" (see an arrow 2022) as the third value are obtained, the storage position number for specifying the ordered set at the slave side becomes "(0−0)+1=1" (see an arrow 2023). By this, a record number "4" corresponding to the storage position number can be acquired (see an arrow 2024).

The storage position number of the ordered set at the slave side becomes the (first value−second value)+third value for following reasons. The set at the slave side is sorted by the key item (in the example, "baseball team") of the join. Accordingly, the third value expresses the start address of the key item of the specified join in the set at the slave side. On the other hand, with respect to the key item of the join, plural elements (that is, records) at the slave side can exist. The (first value−second value) indicates the placing of the element in the plural elements. That is, from the third value+(first value−second value), it is possible to know the placing of the element from start address+start address.

FIGS. 20 to 24 are views for explaining acquisition of record numbers at the master side and the slave side at each of the storage position numbers of "0" to "4" in the arrays storing record numbers of the joined table. As shown in FIGS. 20 to 24, it is understood that on the basis of the record number of the join table, the record number at the master side and the record number at the slave side are acquired.

The processing of the step 1902 to the step 1909 of FIG. 19 is carried out with respect to all storage position numbers of arrays containing the record numbers of the join table, and by this, as shown in FIG. 25, there are obtained an array (master side record number array: see reference numeral 2501) corresponding to an array 2500 containing record numbers of the join table and containing record numbers at the master side and an array (slave side record-number array: see reference numeral 2502) containing record numbers at the slave side.

Record numbers are sequentially extracted from the array 2500, and record numbers in the master side record number array are specified, so that the joined master side table 2610 made of item values of the items of "member name", "area" and "fan" can be acquired. On the other hand, the record numbers in the slave side record number array are specified, so that the joined slave side table 2511 made of item values of items of "team", "game day" and "baseball field" can be acquired.

As stated above, in this embodiment, after the value list relating to the item as the key is made common, the slave side is sorted by the key item, and the array obtained in the process is used, so that the numerical values (addresses) indicating the storage positions of the record numbers at the master side and the slave side are calculated. Accordingly, by the extremely high speed processing, it becomes possible to join two table-format data and to obtain the view using the joined table-format data.

The invention is not limited to the above embodiment, and it is needless to say that various modifications can be made within the scope of the invention recited in the claims, and those are contained in the scope of the invention.

For example, in the above embodiment, although the view is created in which the joined item values at the master side and the slave side become the same, the invention is not limited to this, and it is also possible to create a view containing such slave side item values that the item values at the slave side are not larger than the item values at the master side in the order of sorting, or less than the item values. Hereinafter, the former is referred to as "equality join", and the latter is referred to as "inequality join".

Figure 26:
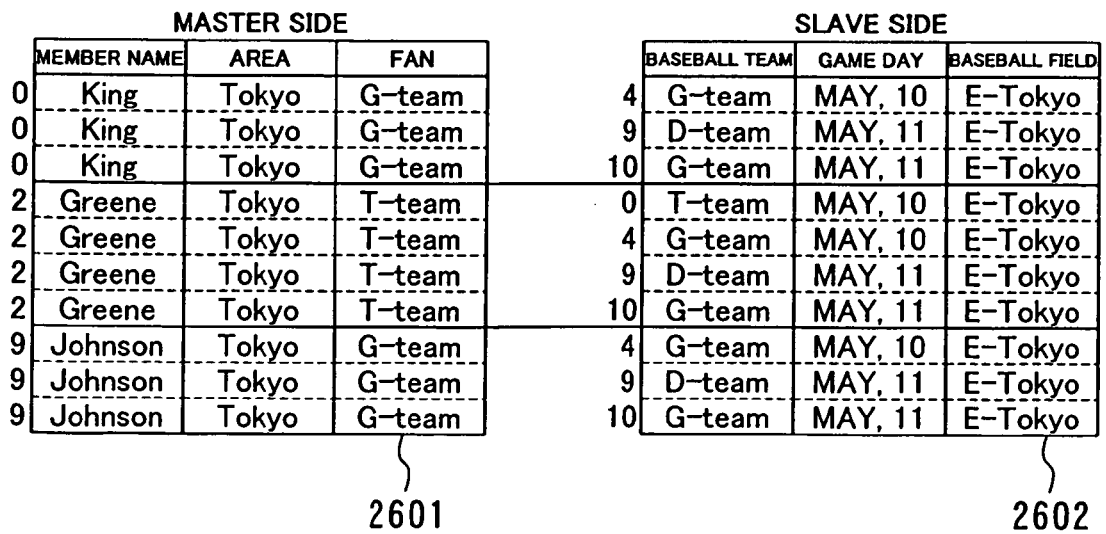
FIG. 26 is a view showing an example of a view presented in an inequality join according to another embodiment.

FIG. 26 is a view showing an example of a view presented in the inequality join. In the example of FIG. 26, between the baseball team (fan) which the member at the master side likes and the baseball team at the slave side, a relation of master side item value a slave side item value is established. Here, the sign of inequality means that in the order of sorting (in the example, in the order of alphabet), an item value equal to an item value at the master side or smaller than the item value, that is, the item value positioned in front appears at the slave side. For example, with respect to the member who has "G-team" as the item "fan" at the master side, records at the slave having the same value as that, or records having "D-team" of the item value smaller than that are enumerated.

A processing for realizing the join as stated above will be described below in brief. Here, except for a part, the same processing as the processing shown in FIG. 10 is carried out. Although the steps 1001 to 1004 of FIG. 10 are also carried out for the inequality join, the creation of the record number list at the step 1005 and the creation of the master side accumulation number array based on this are different from the processing relating to the equality join.

Figure 27:
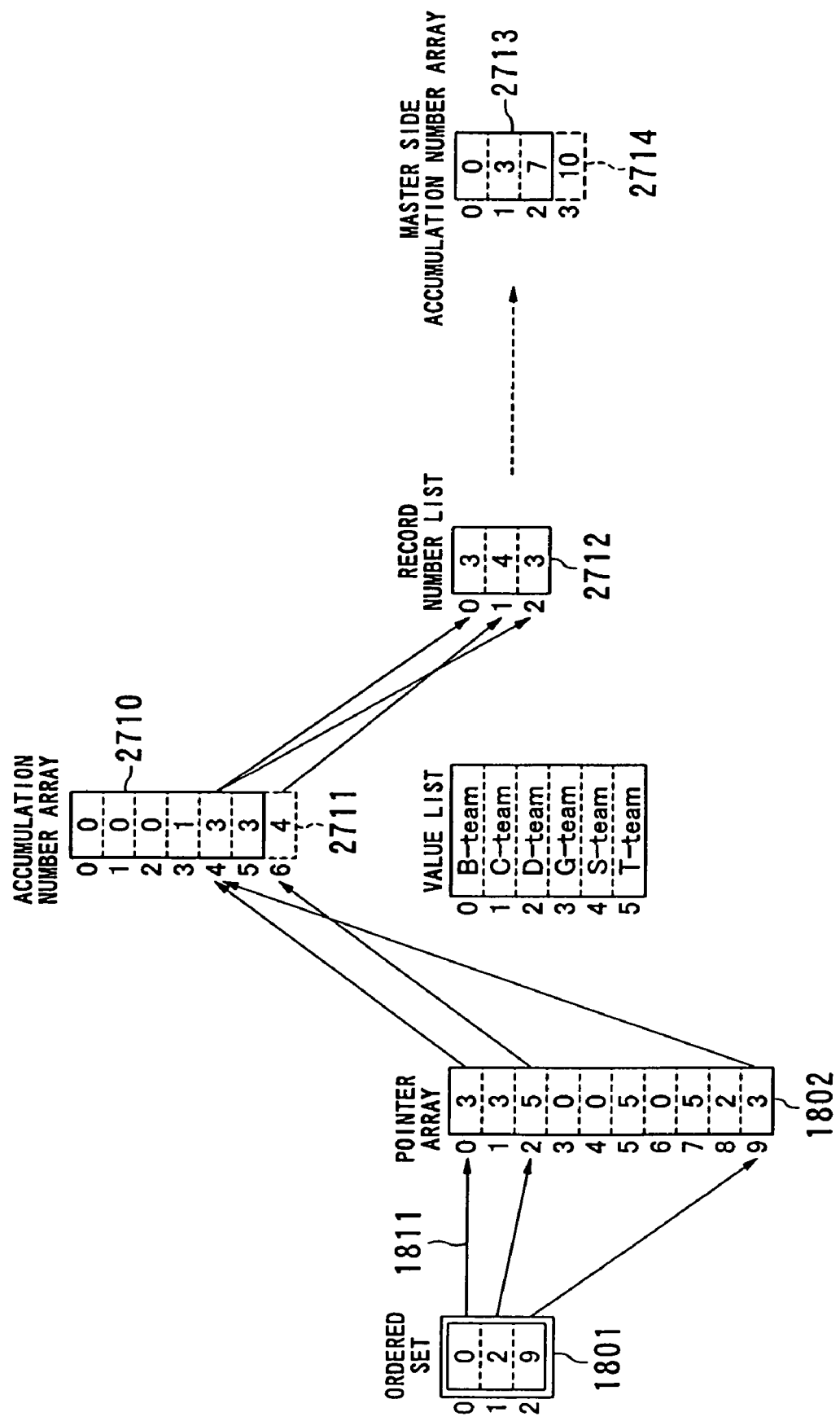
FIG. 27 is a view for explaining the creation of a record number list and the like in an inequality join according to another embodiment.

FIG. 27 is a view for explaining the creation of a record number list and the like in the inequality join. This corresponds to FIG. 18 in the equality join. In the inequality join, an element in an accumulation number array 2710 indicated by a value obtained by adding "1" to a pointer value in a pointer array is specified. Incidentally, in the inequality join, a value indicating a final accumulation number is added to the end in the accumulation number array 2710 at the slave side, (see reference numeral 2711). The above specified element is stored at a specified position of the record number list (see reference numeral 2712). Next, on the basis of the record number list 2712, a master side accumulation number array 2713 is created. Besides, an element (see reference numeral 2714) at the end of the master side accumulation number array is a total sum of record numbers in the record number list 2712. A processing of obtaining the joined view by using these is the same as that shown in FIG. 19.

Besides, in the embodiment, a specified program is loaded into the general computer system 10, and the program is executed out, so that the join of plural table-format data and processing relating to the joined table-format data are realized. However, the invention is not limited to this, and it is needless to say that configuration may be made in, such a manner that a board computer dedicated for database processing is connected to a general computer system such as a personal computer, and the board computer can perform the above processing. Accordingly, in the present specification, the unit does not necessarily mean a physical unit, but includes a case where a function of each unit is realized by software or hardware. Further, a function of one unit may be realized by two or more physical units, or functions of two or more units may be realized by one physical unit.

According to the present invention, it becomes possible to provide a structure of table-format data in which plural table-format data can be joined at a desired high speed, and whose data capacity is small, a concatenating method thereof, and a presentation method of presenting the joined table-format data at an extremely high speed. Besides, according to the invention, it becomes possible to provide a method which does not require a large amount of data areas at the processing of the join.

INDUSTRIAL APPLICABILITY

The present invention can be used especially for a system for managing a large amount of data, for example, a database or a data warehouse. More specifically, it is used for large-scale scientific and technical calculation, basic business management such as accepting order/placing order management or stock exchange, or business management.

The invention claimed is:

1. A method for concatenating table-format data, in which plural table-format data each expressed as an array of records containing an item and item values contained therein are concatenated and the concatenated table-format data is presented, the method comprising the steps of:

constructing each of the table-format data to divide data into one or more information blocks, each including a value list in which in order of item value numbers corresponding to item values belonging to a specific item, the item values are stored, and a pointer array in which pointer values for indicating the item value numbers are stored in order of unique record numbers;

finding an item to be made common to the plural table-format data;

specifying information blocks relating to the item to be made common;

comparing value lists contained in the specified information blocks in the plural table-format data to make both the value lists equivalent to each other;

converting, when the value lists are made equivalent, a pointer array in accordance with addition of an item value in the information block in which the item value is added and creating a new pointer array;

deciding, with respect to the plural table-format data and among the information blocks relating to the specific item, on table-format data in which default sort order is reflected at presentation to be master table format data, and deciding on table-format data other than that data to be slave table-format data;

creating, in the information block that constitutes the slave table-format data and in which the item value becomes equivalent, a slave side existence number array for storing an existence number indicating the number of records relating to the slave table-format data correspondingly to the item value;

referring to the existence number in the slave side existence number array and creating a slave side accumulation number array storing an accumulation number of the existence numbers corresponding to the item values;

extracting, in the information block that constitutes the master table-format data and in which the item value becomes equivalent, a pointer value in the new pointer array indicated by a master side record number;

specifying a first element in the slave side existence number array corresponding to the item value number indicated by the extracted pointer value, and placing the first element in a record number indication array indicating the number of records contained in the slave table-format data corresponding to respective records of the master table-format data at a location corresponding to the master side record number;

referring to the number of records in the record number indication array and creating a master side accumulation number array for storing an accumulation number of the numbers of records corresponding to the master side record number;

obtaining a total sum of the accumulation number of the numbers of records with respect to the master side accumulation number array and creating a new record number array capable of containing the total sum number of elements and for specifying new records relating to the concatenated table-format data;

obtaining a first resultant array containing a record number in the master table-format data in view of duplication by comparing a new record number in the new record number array with a second element in the master side accumulation number array;

specifying a third element in the new pointer array relating to the slave table-format data and corresponding to the item value number indicated by the record number in the master table-format data contained as a fourth element in the first resultant array;

specifying a fifth element in the slave side accumulation number array indicated by the third element in the new pointer array relating to the slave table-format data and temporarily holding the specified fifth element in the slave side accumulation number array as a slave side start address;

obtaining a second resultant array containing a record number in the slave table-format data in view of duplication from a record number in the new record number array, the second element in the master accumulation number array specified by the record number, and the slave side start address;

extracting the item value in the value list relating to the master side information block on the basis of the record number contained in the first resultant array, and extracting the item value in the value list of the slave side information block on the basis of the record number contained in the second resultant array; and creating a view using the extracted item value in the value list relating to the master side information block and the extracted item value in the value list of the slave side information block.

2. A method for concatenating table-format data, in which plural table-format data, each expressed as an array of records containing an item and item values contained therein, are concatenated and the concatenated table-format data is presented, the method comprising the steps of:

constructing each of the table-format data to divide data into one or more information blocks, each including a value list in which in order of item value numbers corresponding to item values belonging to a specific item, the item values are stored, and a pointer array in which pointer values for indicating the item value numbers are stored in order of unique record numbers;

finding an item to be made common to the plural table-format data;

specifying information blocks relating to the item to be made common;

comparing value lists contained in the specified information blocks in the plural table-format data to make both the value lists equivalent to each other;

converting, when the value lists are made equivalent, a pointer array in accordance with addition of an item value in the information block in which the item value is added and creating a new pointer array;

deciding, with respect to the plural table-format data and among the information blocks relating to the specific item, on table-format data in which default sort order is reflected at presentation to be master table format data, and deciding on table-format data other than that data to be slave table-format data;

creating, in the information block that constitutes the slave table-format data and in which the item value becomes equivalent, a slave side existence number array for storing an existence number indicating the number of records relating to the slave table-format data correspondingly to the item value;

referring to the existence number in the slave side existence number array and creating a slave side accumulation number array storing an accumulation number of the existence numbers corresponding to the item value;

extracting, in the information block that constitutes the master table-format data and in which the item value becomes equivalent, a pointer value in the new pointer array indicated by a master side record number;

specifying a first element in the slave side accumulation number array on the basis of the extracted value, and placing the first element in a record number indication array indicating the number of records contained in the slave table-format data corresponding to respective records of the master table-format data at a location corresponding to the master side record number, the number of records being for an item value which is not larger than or less than the value in the value list indicated by the extracted pointer value in sort order of the master side value list;

referring to the number of records in the record number indication array and creating a master side accumulation number array for storing an accumulation number of the numbers of records corresponding to the master side record number;

obtaining a total sum of the accumulation number of the number of records with respect to the master side accumulation number array and creating a new record number array capable of containing the total sum number of elements and for specifying a new record relating to the concatenated table-format data;

obtaining a first resultant array containing record numbers in the master table-format data in view of duplication by comparing a new record number in the new record number array with a second element in the master side accumulation number array;

specifying a third element in the new pointer array relating to the slave table-format data and corresponding to the item value number indicated by the record number in the master table-format data contained as a fourth element in the first resultant array;

specifying a fifth element in the slave side accumulation number array indicated by the third element in the new pointer array relating to the slave table-format data and temporarily holding the specified fifth element in the slave side accumulation number array as a slave side start address;

obtaining a second resultant array containing record numbers in the slave table-format data in view of duplication from the record number in the new record number array, the second element in the master accumulation number array specified by the record number, and the slave side start address;

extracting the item value in the value list relating to the master side information block on the basis of the record number contained in the first resultant array, and extracting the item value in the value list of the slave side information block on the basis of the record number contained in the second resultant array; and creating a view using the extracted item value in the value list relating to the master side information block and the extracted item value in the value list of the slave side information block.

3. The method according to claim 2, further comprising the step of specifying a sixth element in the slave side accumulation number array corresponding to a value larger by one than a value indicated by the extracted pointer value, and placing the specified sixth element in the record number indication array indicating the number of records of the item value which is not larger than the item value in the value list indicated by the extracted pointer value in sort order of the master side value list.

4. The method according to claim 1, characterized in that obtaining the first resultant array includes
  specifying a position where a sixth element in the master accumulation number array, whose value is not larger than the new record number and is maximum, is stored, and
  specifying a seventh element in the new record number array indicated at the position and arranging the specified seventh element to a corresponding position in the first resultant array.

5. The method according to claim 1, characterized in that obtaining the second resultant array includes
  calculating a difference between a record number in the new record number array and a sixth element in the master accumulation number array, which is not larger than the new record number and is maximum,
  adding the sixth element temporarily held as the start address and the calculated difference, and
  arranging a value obtained by the addition to a corresponding position in the second resultant array.

6. A program for concatenating table-format data, in which plural table-format data, each expressed as an array of records containing an item and item values contained therein, are concatenated and the concatenated table-format data is presented, wherein the program is contained in a memory of a computer and causes the computer to execute the steps of:
  constructing each of the table-format data to divide data into one or more information blocks, each including a value list in which in order of item value numbers corresponding to item values belonging to a specific item, the item values are stored, and a pointer array in which pointer values for indicating the item value numbers are stored in order of unique record numbers;
  finding an item to be made common to the plural table-format data;
  specifying information blocks relating to the item to be made common;
  comparing value lists contained in the specified information blocks in the plural table-format data to make both the value lists equivalent to each other;
  converting, when the value lists are made equivalent, a pointer array in accordance with addition of an item value in the information block in which the item value is added and creating a new pointer array;
  deciding, with respect to the plural table-format data and among the information blocks relating to the specific item, on table-format data in which default sort order is reflected at presentation to be master table format data, and deciding on table-format data other than that data to be slave table-format data;
  creating, in the information block that constitutes the slave table-format data and in which the item value becomes equivalent, a slave side existence number array for storing an existence number indicating the number of records relating to the slave table-format data correspondingly to the item value;
  referring to the existence number in the slave side existence number array and creating a slave side accumulation number array storing an accumulation number of the existence numbers corresponding to the item values;
  extracting, in the information block that constitutes the master table-format data and in which the item value becomes equivalent, a pointer value in the new pointer array indicated by a master side record number;
  specifying a first element in the slave side existence number array corresponding to the item value number indicated by the extracted pointer value, and placing the first element in a record number indication array indicating the number of records contained in the slave table-format data corresponding to respective records of the master table-format data at a location corresponding to the master side record number;
  referring to the number of records in the record number indication array and creating a master side accumulation number array for storing an accumulation number of the numbers of records corresponding to the master side record number;
  obtaining a total sum of the accumulation number of the numbers of records with respect to the master side accumulation number array and creating a new record number array capable of containing the total sum number of elements and for specifying new records relating to the concatenated table-format data;
  obtaining a first resultant array containing a record number in the master table-format data in view of duplication by comparing a new record number in the new record number array with a second element in the master side accumulation number array;
  specifying a third element in the new pointer array relating to the slave table-format data and corresponding to the item value number indicated by the record number in the master table-format data contained as the fourth element in the first resultant array;
  specifying a fifth element in the slave side accumulation number array indicated by the third element in the new pointer array relating to the slave table-format data and temporarily holding the specified fifth element as a slave side start address;
  obtaining a second resultant array containing a record number in the slave table-format data in view of duplication from a record number in the new record number array, the second element in the master accumulation number array specified by the record number, and the slave side start address;
  extracting the item value in the value list relating to the master side information block on the basis of the record number contained in the first resultant array, and extracting the item value in the value list of the slave side information block on the basis of the record number contained in the second resultant array; and
  creating a view using the extracted item value in the value list relating to the master side information block and the extracted item value in the value list of the slave side information block.

7. A program for concatenating table-format data, in which plural table-format data, each expressed as an array of records containing an item and item values contained therein, are concatenated and the concatenated table-format data is presented, wherein the program is contained in a memory of a computer and causes the computer to execute the steps of:
  constructing each of the table-format data to divide data into one or more information blocks each including a value list in which in order of item value numbers corresponding to item values belonging to a specific item, the item values are stored, and a pointer array in which pointer values for indicating the item value numbers are stored in order of unique record numbers;
  finding an item to be made common to the plural table-format data;

specifying information blocks relating to the item to be made common;

comparing value lists contained in the specified information blocks in the plural table-format data to make both the value lists equivalent to each other;

converting, when the value lists are made equivalent, a pointer array in accordance with addition of an item value in the information block in which the item value is added and creating a new pointer array;

deciding, with respect to the plural table-format data and among the information blocks relating to the specific item, on table-format data in which default sort order is reflected at presentation to be master table format data, and deciding on table-format data other than that data to be slave table-format data;

creating, in the information block that constitutes the slave table-format data and in which the item value becomes equivalent, a slave side existence number array for storing an existence number indicating the number of records relating to the slave table-format data correspondingly to the item value;

referring to the existence number in the slave side existence number array and creating a slave side accumulation number array storing an accumulation number of the existence numbers corresponding to the item value;

extracting, in the information block that constitutes the master table-format data and in which the item value becomes equivalent, a pointer value in the new pointer array indicated by a master side record number;

specifying a first element in the slave side accumulation number array on the basis of the extracted value, and placing the first element in a record number indication array indicating the number of records contained in the slave table-format data corresponding to respective records of the master table-format data at a location corresponding to the master side record number, the number of records being for an item value which is not larger than or less than the value in the value list indicated by the extracted pointer value in sort order of the master side value list;

referring to the number of records in the record number indication array and creating a master side accumulation number array for storing an accumulation number of the numbers of records corresponding to the master side record number;

obtaining a total sum of the accumulation number of the number of records with respect to the master side accumulation number array and creating a new record number array capable of containing the total sum number of elements and for specifying a new record relating to the concatenated table-format data;

obtaining a first resultant array containing record numbers in the master table-format data in view of duplication by comparing a new record number in the new record number array with a second element in the master side accumulation number array;

specifying a third element in the new pointer array relating to the slave table-format data and corresponding to the item value number indicated by the record number in the master table-format data contained as the fourth element in the first resultant array;

specifying a fifth element in the slave side accumulation number array indicated by the third element in the new pointer array relating to the slave table-format data and temporarily holding the specified fifth element as a slave side start address;

obtaining a second resultant array containing record numbers in the slave table-format data in view of duplication from the record number in the new record number array, the second element in the master accumulation number array specified by the record number, and the slave side start address;

extracting the item value in the value list relating to the master side information block on the basis of the record number contained in the first resultant array, and extracting the item value in the value list of the slave side information block on the basis of the record number contained in the second resultant array; and creating a view using the extracted item value in the value list relating to the master side information block and the extracted item value in the value list of the slave side information block.

8. The program according to claim 7, wherein the program further causes the computer to execute the step of specifying a sixth element in the slave side accumulation number array corresponding to a value larger by one than a value indicated by the extracted pointer value, and placing the specified sixth element in a record number indication array indicating the number of records of the item value which is not larger than the item value in the value list indicated by the extracted pointer value in sort order of the master side value list.

9. The program according to claim 6, wherein the program further causes the computer to execute in obtaining the first resultant array, the steps of specifying a position where a sixth element in the master accumulation number array, whose value is not larger than the new record number and is maximum, is stored, and specifying a seventh element in the new record number array indicated at the position and arranging the specified seventh element to a corresponding position in the first resultant array.

10. The program according to claim 6, wherein the program further causes the computer to execute in obtaining the second resultant array, the steps of calculating a difference between a record number in the new record number array and a sixth element in the master accumulation number array, which is not larger than the new record number and is maximum, adding the sixth element temporarily held as the start address and the calculated difference, and arranging a value obtained by the addition to a corresponding position in the second resultant array.

* * * * *